(12) United States Patent
Tanaka et al.

(10) Patent No.: US 10,460,528 B2
(45) Date of Patent: Oct. 29, 2019

(54) FIGURE DRAWING APPARATUS, CONTROL METHOD OF FIGURE DRAWING APPARATUS, AND RECORDING MEDIUM

(71) Applicant: CASIO COMPUTER CO., LTD., Tokyo (JP)

(72) Inventors: Hirokazu Tanaka, Fuchu (JP); Kentaro Okuma, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/873,320

(22) Filed: Jan. 17, 2018

(65) Prior Publication Data

US 2018/0204388 A1 Jul. 19, 2018

(30) Foreign Application Priority Data

Jan. 17, 2017 (JP) .................. 2017-006189

(51) Int. Cl.
| | |
|---|---|
| *G06T 11/20* | (2006.01) |
| *G06T 19/20* | (2011.01) |
| *G06F 17/17* | (2006.01) |
| *G06F 7/57* | (2006.01) |
| *G06T 15/10* | (2011.01) |
| *G06F 15/02* | (2006.01) |
| *G06F 3/0482* | (2013.01) |
| *G06F 3/0484* | (2013.01) |
| *G06F 3/0488* | (2013.01) |

(52) U.S. Cl.
CPC .......... *G06T 19/20* (2013.01); *G06F 3/0482* (2013.01); *G06F 3/04847* (2013.01); *G06F 7/57* (2013.01); *G06F 15/02* (2013.01); *G06F 17/17* (2013.01); *G06T 11/203* (2013.01); *G06T 11/206* (2013.01); *G06T 15/10* (2013.01); *G06F 3/04886* (2013.01)

(58) Field of Classification Search
None
See application file for complete search history.

(56) References Cited

U.S. PATENT DOCUMENTS

2008/0291669 A1* 11/2008 Roberts .............. H05B 33/0821
362/227
2009/0073180 A1* 3/2009 Yamauchi ............... G06T 11/40
345/569

FOREIGN PATENT DOCUMENTS

| JP | 2005-182125 A | 7/2005 |
|---|---|---|
| JP | 4012258 B2 | 11/2007 |
| JP | 2010-198144 A | 9/2010 |
| JP | 2013-203006 A | 10/2013 |

* cited by examiner

*Primary Examiner* — Andrew G Yang
(74) *Attorney, Agent, or Firm* — Scully Scott Murphy & Presser

(57) ABSTRACT

According to one embodiment, there is provided a control method of a figure drawing apparatus including a processor, the control method performed by the processor including a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device.

19 Claims, 12 Drawing Sheets

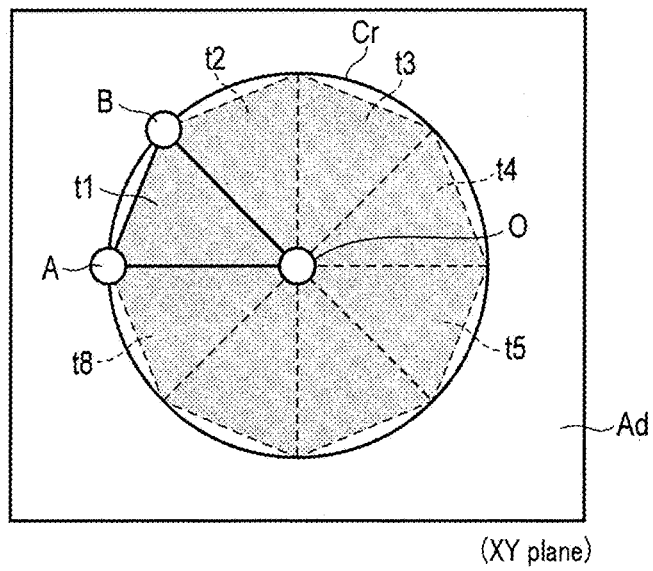

(XY plane)

FIG. 3

⟨Within drawing area ○/outside of drawing area ×⟩                    T

| Vertex coordinates of grid<br>O   A   B | Display of grid | Correction of vertex coordinates |
|---|---|---|
| (1)  ○   ○   ○ | Display | No correction |
| (2)  ○   ○   × | Display | With correction |
| (3)  ○   ×   ○ | Display | With correction |
| (4)  ○   ×   × | Display | With correction |
| (5)  ×   ○   ○ | Display | With correction |
| (6)  ×   ○   × | Non-display | No correction |
| (7)  ×   ×   ○ | Non-display | No correction |
| (8)  ×   ×   × | Non-display | No correction |
| (9)  Outside of Z-directional area | Non-display | No correction |

FIG. 4

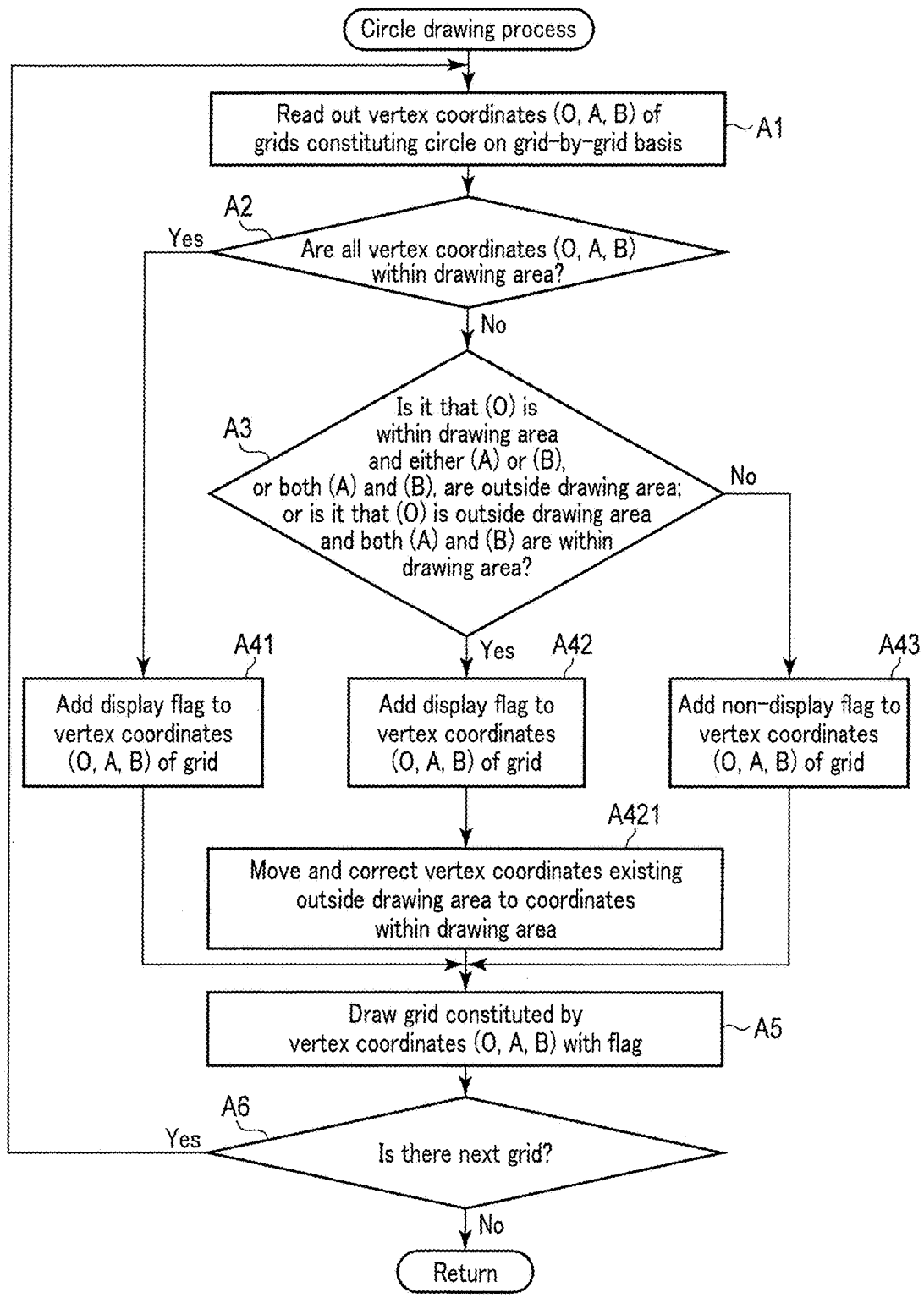
F I G. 8

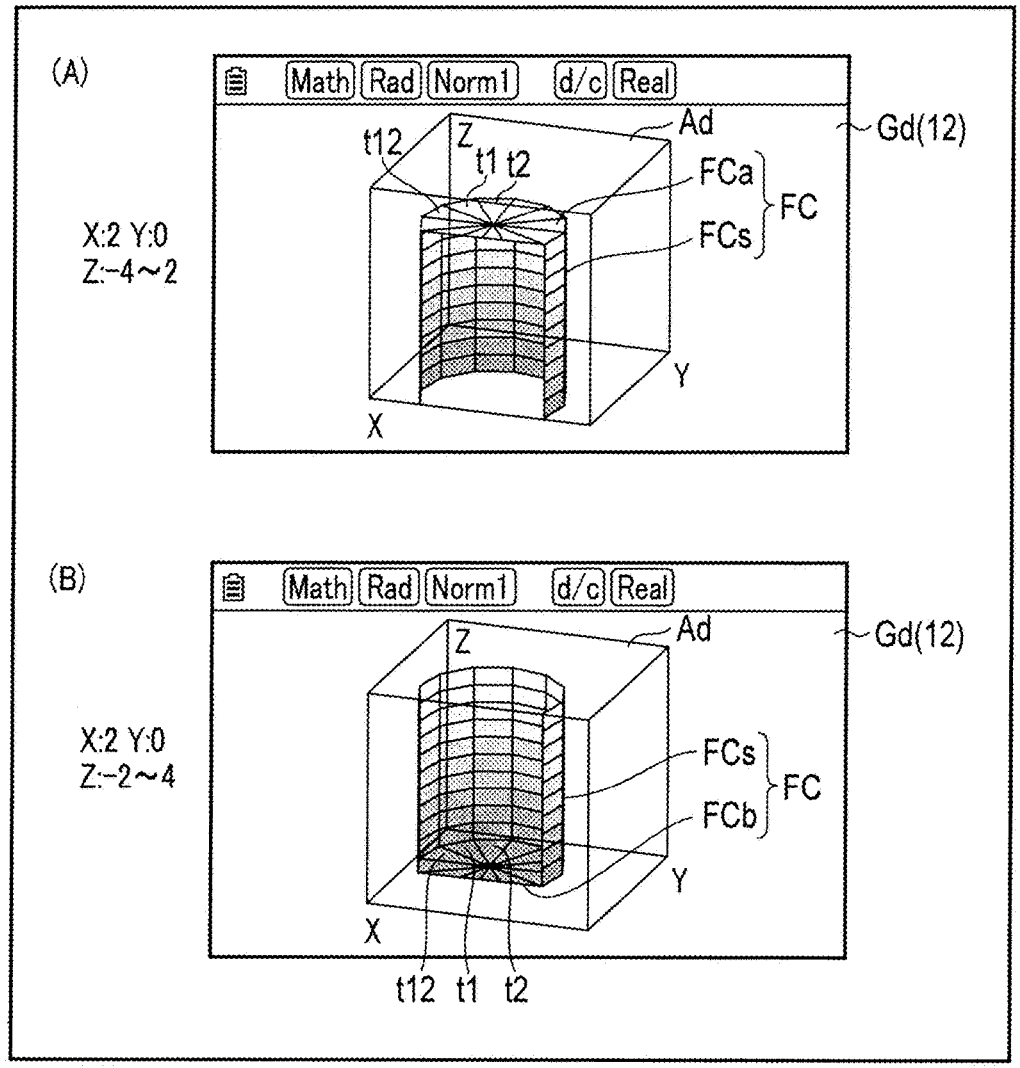
F I G. 13

FIGURE DRAWING APPARATUS, CONTROL METHOD OF FIGURE DRAWING APPARATUS, AND RECORDING MEDIUM

CROSS-REFERENCE TO RELATED APPLICATIONS

This application is based upon and claims the benefit of priority from prior Japanese Patent Application No. 2017-006189, filed Jan. 17, 2017, the entire contents of which are incorporated herein by reference.

BACKGROUND OF THE INVENTION

1. Field of the Invention

The technical field relates to a figure drawing apparatus, a control method of a figure drawing apparatus, and a recording medium.

2. Description of the Related Art

Conventionally, there is known a method of drawing a 3D (three-dimensional) stereoscopic figure. In this method, in a coordinate system of X, Y and Z, a Z coordinate corresponding to coordinates of (X, Y) is determined by a function of $Z=f(x, y)$, and the coordinates of (X, Y, Z) are plotted as a 3D graph. This method of plotting the drawing of the stereoscopic figure as the 3D graph is a relatively easy arithmetic process and can be realized without requiring a high-speed, high-performance processor (CPU). However, it is not possible to easily draw a circular cylinder (including an elliptic cylinder), a circular cone (including an elliptical cone), a polygonal column, and a polygonal pyramid.

In addition, conventionally, as disclosed in Jpn. Pat. Appln. KOKAI Publication No. 2005-182125, for instance, there is known a method of modeling surfaces of a stereoscopic figure as a set of polygons (grids). Not only any kind of stereoscopic figure can be drawn, but also processes such as movement, enlargement/reduction, inversion and rotation can be applied. However, the amount of arithmetic calculations becomes relatively large. This KOKAI Publication No. 2005-182125 does not particularly disclose a drawing process of a polygon which protrudes to the outside of a drawing area which is set separately.

BRIEF SUMMARY OF THE INVENTION

According to one embodiment, there is provided a control method of a figure drawing apparatus including a processor, the control method performed by the processor including a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device.

According to another embodiment, there is provided a figure drawing apparatus including a processor, the processor executing, in accordance with an instruction stored in a storage unit, a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device.

According to another embodiment, there is provided a non-transitory recording medium having a program recorded thereon that is executable to control a computer to execute a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view for describing a drawing method of a circle Cr of a circular cylinder, which is actually taken in a circular cylinder (circle-added figure) drawing process of the embodiment.

FIG. 4 is a table T showing display/non-display conditions corresponding to the relationship between vertex coordinates (O, A, B) of grids (triangles) tn, which constitute the circle Cr in a circle drawing process of the figure drawing apparatus 10, and a drawing area Ad.

FIG. 8 is a flowchart illustrating the circle drawing process in the circular cylinder (circle-added figure) drawing process of the figure drawing apparatus 10.

FIG. 10 is a view illustrating a display operation (second embodiment) corresponding to a user operation according to the circular cylinder (circle-added figure) drawing process of the figure drawing apparatus 10.

FIG. 11 is a view illustrating a display operation (third embodiment) corresponding to a user operation according to the circular cylinder (circle-added figure) drawing process of the figure drawing apparatus 10.

FIG. 13 is a view illustrating a display operation (fourth embodiment) corresponding to a user operation according to the circular cylinder (circle-added figure) drawing process of the figure drawing apparatus 10.

DETAILED DESCRIPTION OF THE PREFERRED EMBODIMENTS

Embodiments of the present invention will be described hereinafter with reference to the accompanying drawings.

Figure 1:
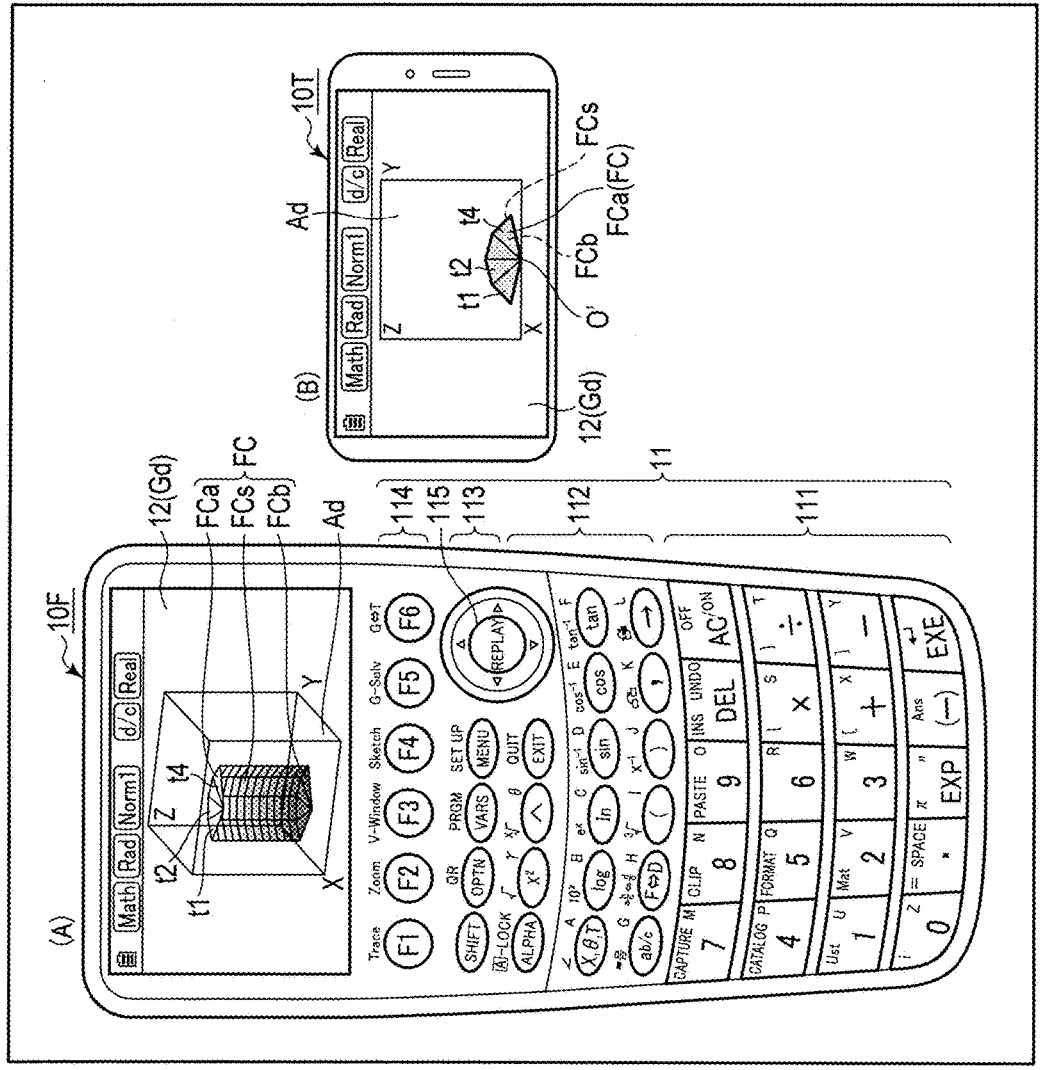
FIG. 1 is a front view illustrating an external configuration of a figure drawing apparatus 10 according to an embodiment of the present invention, part (A) of FIG. 1 being a view illustrating a case in which the figure drawing apparatus 10 is implemented as a graph scientific calculator 10F, and part (B) of FIG. 1 being a view illustrating a case in which the figure drawing apparatus 10 is implemented as a tablet terminal 10T.

FIG. 1 is a front view illustrating an external configuration of a figure drawing apparatus 10 according to an embodiment of the present invention. Part (A) of FIG. 1 is a view illustrating a case in which the figure drawing apparatus 10 is implemented as a graph scientific calculator 10F. Part (B) of FIG. 1 is a view illustrating a case in which the figure drawing apparatus 10 is implemented as a tablet terminal 10T.

The figure drawing apparatus 10 can be configured as the graph scientific calculator 10F or tablet terminal 10T. In addition, the figure drawing apparatus 10 can be configured as a personal computer, a smartphone, a mobile phone, a touch panel-type PDA (personal digital assistants), an electronic book, a portable game console, etc., which have figure drawing functions (i.e. in which figure display control programs are installed).

Besides, in the figure drawing apparatus 10 like the tablet terminal 10T which do not have such physical keys (buttons) as those provided in the graph scientific calculator 10F, a software keyboard simulating the keys of the graph scientific calculator 10F is displayed, and a process is executed in response to a key operation on the software keyboard.

Because of the need for portability, the graph scientific calculator 10F has such a small size that a user can surely hold the calculator 10F by one hand and can perform operations by one hand. A key input unit 11 and a display output unit 12 are provided on the front surface of the main body of this graph scientific calculator 10.

The key input unit 11 is provided with a numeric/arithmetic sign key group 111 for inputting numerical values and mathematical expressions and instructing the execution of calculations; a functional-calculation function key group 112 for inputting various functions and activating a memory function; a mode setup key group 113 for displaying menu screens of various operation modes and instructing setup of operation modes; a function key group 114 for activating, by a single key operation, various functions displayed along a lower end of the display output unit 12; and a cursor key 115 for performing a moving operation of a cursor displayed on the display output unit 12 and a selection operation of data items.

As the numeric/arithmetic sign key group 111, [0]~[9] (numeric) keys, [+], [−], [×] and [÷] (signs of four rules) keys, an [EXE] (execution) key, an [AC] (clear) key, etc. are arranged.

As the functional-calculation function key group 112, a [sin] (sine) key, a [cos] (cosine) key, a [tan] (tangent) key, etc. are arranged.

As the mode setup key group 113, a [MENU] key, a [SHIFT] key, an [OPTN] (option) key, etc. are arranged.

As the function key group 114, an [F1] key to an [F6] key are arranged.

Besides, when each key of the numeric/arithmetic sign key group 111, functional-calculation function key group 112, mode setup key group 113 and function key group 114 is operated successively after the operation of the [SHIFT] key, this key can function not as the key function described on the key top thereof, but as the function described above this key. For example, if the [AC] key is operated after the operation of the [SHIFT] key (hereinafter referred to as "[SHIFT]+[AC] key"), the [AC] key functions as an [OFF] (power off) key. The [SHIFT]+[MENU] key functions as a [SET UP] (setup) key. The [SHIFT]+[F3] key functions as a [V-Window] (View Window: for instructing display of a drawing area setup screen Gv) key.

The display output unit 12 is composed of a dot-matrix type liquid crystal display unit. Besides, the display output unit 12 of the tablet terminal 10T is composed of a liquid crystal display unit over which a touch panel is laid.

Figure 2:
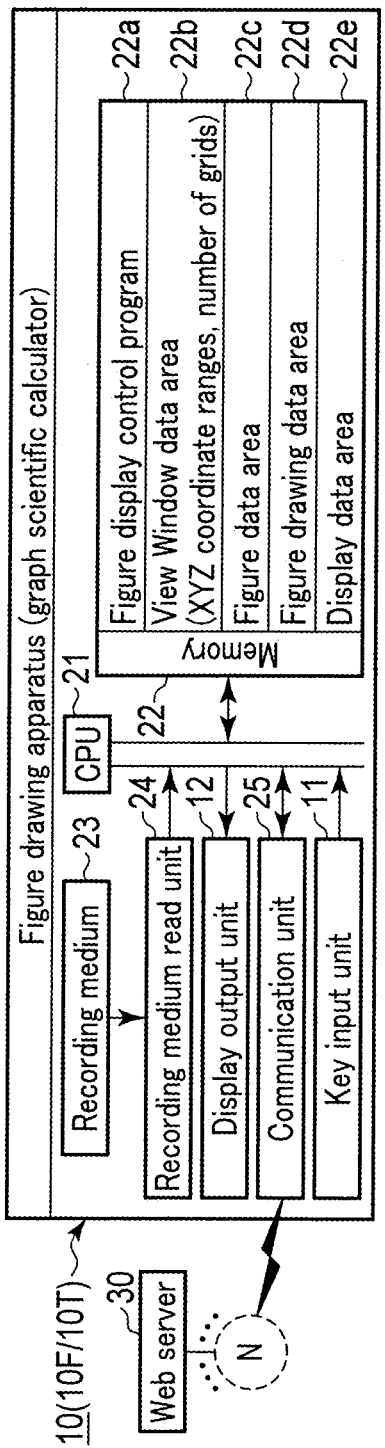
FIG. 2 is a block diagram illustrating the configuration of electronic circuitry of the figure drawing apparatus 10 (10F/10T).

FIG. 2 is a block diagram illustrating the configuration of electronic circuitry of the figure drawing apparatus 10 (10F/10T).

The electronic circuitry of this figure drawing apparatus 10 includes, in addition to the above-described key input unit 11 and display output unit 12, a CPU 21 that is a computer, a memory 22, a recording medium read unit 24, and a communication unit 25.

The CPU 21 controls the operations of the respective circuitry components according to a figure display control program 22a stored in the memory 22, and executes various arithmetic processes corresponding to key input signals from the key input unit 11. This figure display control program 22a may be prestored in the memory 22, or may be stored in the memory 22 by being read in from an external recording medium 23 such as a memory card through the recording medium read unit 24. The figure display control program 22a is configured to be not rewritable by the user's operation of the key input unit 11.

In the memory 22, an area, which stores data that is rewritable by the user, is secured in addition to the area which stores the information that is not rewritable by the user as described above. This rewritable area stores data of mathematical expressions, table data, graph data, etc., which are constituted by key code data that are successively key-input by the key input unit 11.

In addition, in the area of the memory 14, which stores the rewritable data, a V-Window data area 22b, a figure data area 22c, a figure drawing data area 22d and a display data area 22e are secured.

The V-Window data area 22b stores data of a drawing area Ad (Xmin, max/Ymin, max/Zmin, max) of 3D coordinates for stereoscopic figure drawing and data of a division number (grid) of grids (polygons), which are input in accordance with user operations on a drawing area setup screen Gv (see FIG. 9: here, drawing area setup screen Gv for stereoscopic figure drawing) displayed on the display output unit 12 by operating the [V-Window] (View Window) key.

The figure data area 22c stores data of a stereoscopic figure (drawing data (a mathematical expression corresponding to a figure and radius R/height Z/center coordinates XY which are parameters of the mathematical expression) for forming a figure (circle-added figure) with reference to the above-described drawing area Ad)). The data of the stereoscopic figure is input in accordance with user operations on a 3D graph setup screen Gs (see FIG. 9: here, 3D graph setup screen Gs for drawing a circular cylinder (circle-added figure)). The 3D graph setup screen Gs is displayed on the display output unit 12 by selecting an icon [3D-Graph] for drawing a stereoscopic figure from an operation menu (not shown) displayed in accordance with the operation of the above-described [MENU] (menu) key.

The figure drawing data area 22d stores drawing data of the stereoscopic figure (vertex coordinates of each of grids which constitute, by a set of grids (polygonal grids), a surface of the stereoscopic figure). The drawing data of the stereoscopic figure is generated by an arithmetic process with reference to the above-described drawing area Ad, based on the data of the stereoscopic figure stored in the figure data area 22c.

The display data area 22e includes a memory area corresponding to the size of a display screen of the liquid crystal display unit that constitutes the display output unit 12. This memory area stores display data, which is to be displayed on the display screen, as bitmap data (here, bitmap data developed in accordance with the data of the drawing area and the drawing data of the stereoscopic figure).

In this figure drawing apparatus 10 (10F/10T) with the above-described configuration, the CPU 21 controls the operations of the respective circuitry components according to the instructions described in the figure display control program 22a, and the software and hardware cooperate to realize a figure drawing function which will be described in the following operational description.

Next, the operation according to the figure drawing function of the figure drawing apparatus 10 with the above-described configuration will be described.

To begin with, the outline of circular cylinder (circle-added figure) drawing process is described.

In this circular cylinder (circle-added figure) drawing process, the data of the above-described drawing area and the data of the stereoscopic figure (circular cylinder (circle-added figure)) are set in accordance with the above-described drawing area setup screen Gv and 3D graph setup screen Gs. Then, a coordinate sequence constituting the circumference of one circle (upper cover) corresponding to the data of the circular cylinder on the 3D coordinates and a coordinate sequence constituting the circumference of the other circle (lower cover) are arithmetically processed and calculated. In addition, a coordinate sequence constituting a line connecting the calculated coordinate sequence corresponding to the one circle and the coordinate sequence corresponding to the other circle is arithmetically processed and calculated as a coordinate sequence constituting a side surface of the circular cylinder.

In addition, of the calculated coordinate sequence corresponding to the one circle, coordinate sequence corresponding to the other circle and coordinate sequence corresponding to the side surface of the circular cylinder, the coordinate points included in the drawing area Ad are drawn in the order of the one circle, the other circle and the side surface. Thereby, the set-up circular cylinder (circle-added figure) is displayed.

At this time, as regards the one circle and the other circle, the surfaces thereof are constituted by the sets of many triangles (grids) which are formed by being divided by radial lines connecting the coordinate point of the center of each circle and the respective coordinate points corresponding to the circumference of the circle, and by being divided by lines connecting the respective coordinate points on the circumference of the circle. In addition, the side surface is constituted by the set of many quadrangles (grids) which are formed by being divided by lines connecting the respective coordinate points corresponding to the circumference of the one circle, and the respective coordinate points corresponding to the circumference of the other circle.

Actually, drawing is not performed with respect to all the calculated coordinate points which constitute the one circle, the other circle and the side surface. Drawing is performed as will be described below.

FIG. 3 is a view for describing a drawing method of a circle Cr of a circular cylinder, which is actually taken in a circular cylinder (circle-added figure) drawing process of the embodiment.

Specifically, a division number n (8 divisions in the case of FIG. 3) of triangles (grids) tn, which constitute the circle Cr, is set. Then, as regards each of the one circle Cr and other circle Cr, the vertex coordinates (O, A, B) of the respective triangles t1 to t8, which are divided in the circumferential direction with reference to the center coordinates O of the circle Cr in accordance with the set division umber n (=8), are determined. The circle Cr is drawn by a set of surfaces of the triangles t1 to t8, each of which is surrounded by straight lines connecting the vertex coordinates (O, A, B).

In addition, as regards the side surface, too, a division number m of quadrangles (grids), which constitute the side surface between the one circle Cr and other circle Cr, is set. Then, vertex coordinates of quadrangles, which are vertically and horizontally divided by straight lines in a vertical direction (Z direction) and straight lines in a horizontal direction (X-Y direction), are determined and the side surface is drawn. The straight lines in the vertical direction (Z direction) connect the coordinate points (A, B, . . . ) on the circumference of the triangles tn into which the one circle Cr is divided, and the coordinate points (A, B, . . . ) on the circumference of the triangles tn into which the other circle Cr is divided. The straight lines in the horizontal direction (X-Y direction) divides a region between the one circle Cr and other circle Cr in accordance with the set-up division number m.

FIG. 4 is a table T showing display/non-display conditions corresponding to the relationship between the vertex coordinates (O, A, B) of grids (triangles) tn, which constitute the circle Cr in a circle drawing process of the figure drawing apparatus 10, and the drawing area Ad.

Figure 5:
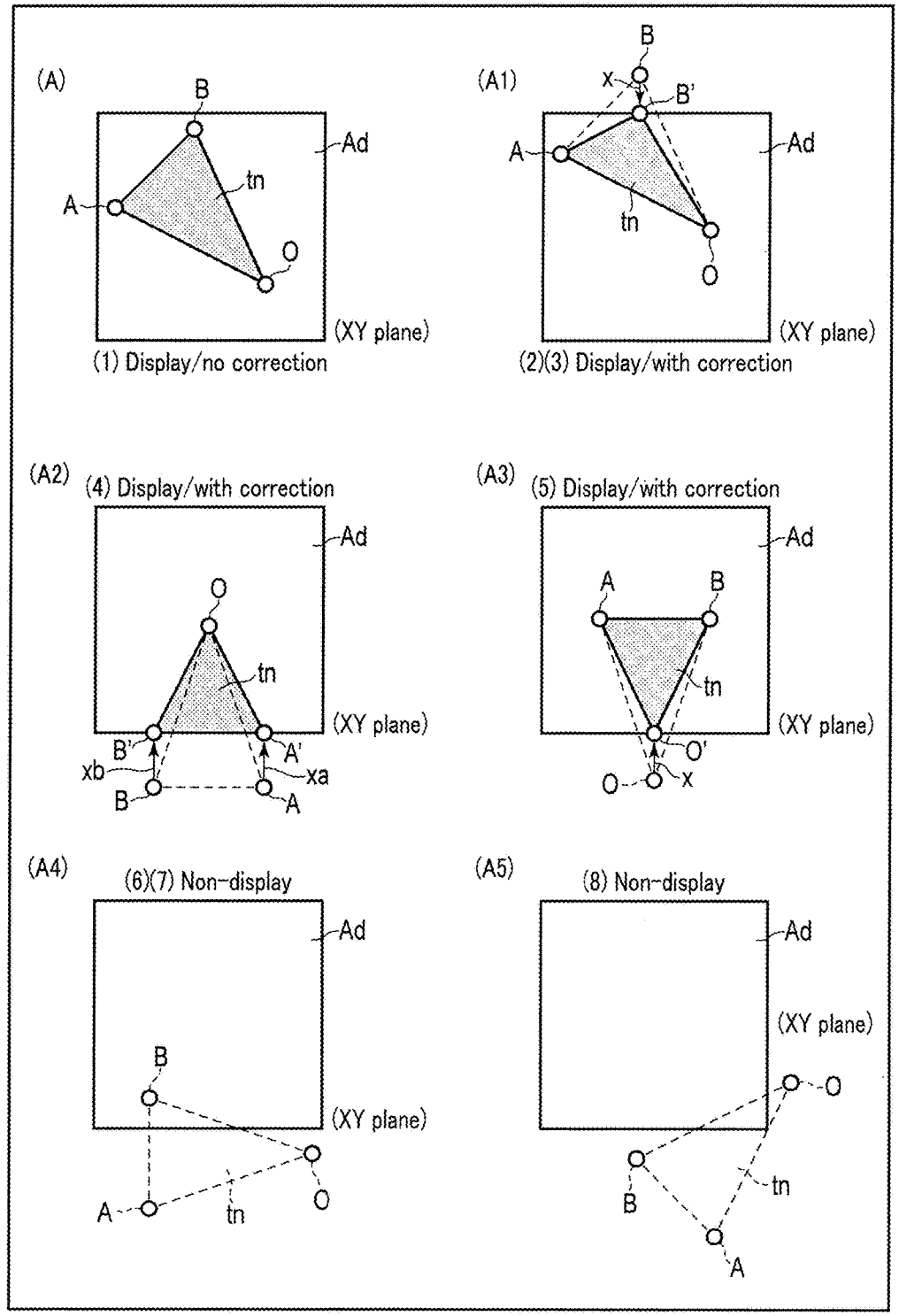
FIG. 5 is a view illustrating a correction method (part 1) of the vertex coordinates (O, A, B) corresponding to the display/non-display conditions of the grids (triangles) tn, which constitute the circle Cr in the circle drawing process of the figure drawing apparatus 10.

FIG. 5 is a view illustrating a correction method (part 1) of the vertex coordinates (O, A, B) corresponding to the display/non-display conditions of the grids (triangles) tn, which constitute the circle Cr in the circle drawing process of the figure drawing apparatus 10.

Figure 6:
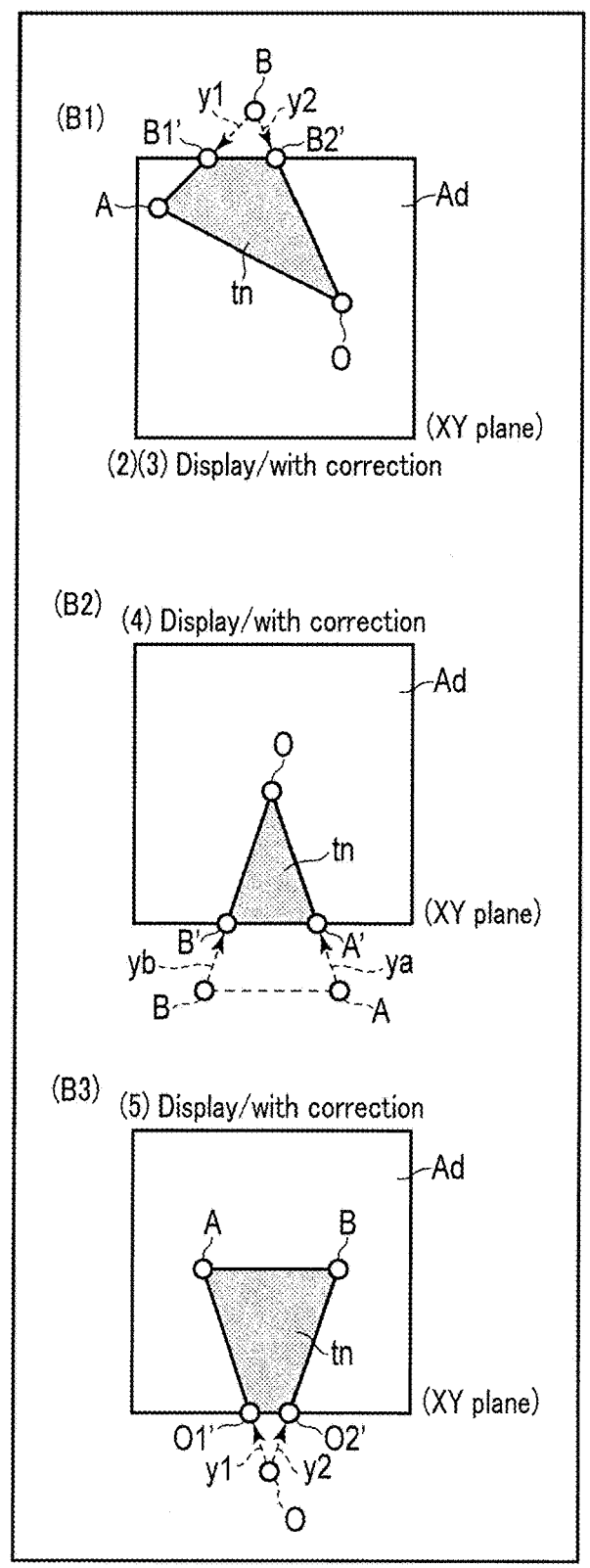
FIG. 6 is a view illustrating a correction method (part 2) of the vertex coordinates (O, A, B) corresponding to the display/non-display conditions of the grids (triangles) tn, which constitute the circle Cr in the circle drawing process of the figure drawing apparatus 10.

FIG. 6 is a view illustrating a correction method (part 2) of the vertex coordinates (O, A, B) corresponding to the display/non-display conditions of the grids (triangles) tn, which constitute the circle Cr in the circle drawing process of the figure drawing apparatus 10.

Specifically, when each grid (triangle) tn constituting the circle Cr is drawn and displayed, if all vertex coordinates (O, A, B) of the grid (triangle) tn are within the drawing area Ad (see (1) in FIG. 4 and part (A) of FIG. 5), the grid (triangle) tn is displayed as such with no correction.

In addition, of the vertex coordinates (O, A, B) of the grid (triangle) tn, if the vertex coordinates A or B are outside the drawing area Ad (see (2) and (3) in FIG. 4 and part (A1) of FIG. 5/part (B1) of FIG. 6), the vertex coordinates A or B existing outside the area are moved in the area and corrected, and a corrected grid (triangle/quadrangle) tn is displayed.

Besides, of the vertex coordinates (O, A, B) of the grid (triangle) tn, if the vertex coordinates A and B are outside the drawing area Ad (see (4) in FIG. 4 and part (A2) of FIG. 5/part (B2) of FIG. 6), the vertex coordinates A and B existing outside the area are moved in the area and corrected, and a corrected grid (triangle) tn is displayed.

Moreover, of the vertex coordinates (O, A, B) of the grid (triangle) tn, if the vertex coordinates O are outside the drawing area Ad (see (5) in FIG. 4 and part (A3) of FIG. 5/part (B3) of FIG. 6), the vertex coordinates O existing outside the area are moved in the area and corrected, and a corrected grid (triangle/quadrangle) tn is displayed.

On the other hand, of the vertex coordinates (O, A, B) of the grid (triangle) tn, if the vertex coordinates O and A, or vertex coordinates O and B, are outside the drawing area Ad (see (6) and (7) in FIG. 4 and part (A4) of FIG. 5), the grid (triangle) tn is not displayed.

If all of the vertex coordinates (O, A, B) of the grid (triangle) tn are outside the drawing area Ad (see (8) in FIG. 4 and part (A5) of FIG. 5), the grid (triangle) tn is not displayed.

Besides, when the maximum or minimum value of the height Z in the drawing data (the mathematical expression corresponding to the figure and the parameters thereof, i.e. radius R/height Z/center coordinates X, Y) of the stereoscopic figure (circular cylinder (circle-added figure)) to be drawn are outside a Z-directional area Zmin~Zmax in the drawing area Ad, this case corresponds to a case in which all vertex coordinates (O, A, B) of each grid (triangle) tn constituting the circle Cr is outside the drawing area Ad (see (9) in FIG. 4). Thus, each grid (triangle) tn is not displayed.

Here, the correction method (part 1) of the vertex coordinates (O, A, B) in the grid (triangle) tn shown in parts (A1) to (A3) of FIG. 5 is a correction method in which vertex coordinates existing outside the drawing area Ad are moved to, and replaced with, a closest point in the drawing area Ad.

For example, as illustrated in part (A1) of FIG. 5, if the vertex coordinates B of the vertex coordinates (O, A, B) of the grid (triangle) tn are outside the drawing area Ad (the case of condition (2) in FIG. 4), the coordinates B outside the area are replaced with, and corrected to, a closest point B' in the area as indicated by an arrow x, and a corrected grid (triangle O, A, B') tn is displayed.

For example, as illustrated in part (A2) of FIG. 5, if the vertex coordinates A and B of the vertex coordinates (O, A, B) of the grid (triangle) tn are outside the drawing area Ad (the case of condition (4) in FIG. 4), the coordinates A and B outside the area are replaced with, and corrected to, closest points A' and B' in the area as indicated by arrows xa and xb, and a corrected grid (triangle O, A', B') tn is displayed.

For example, as illustrated in part (A3) of FIG. 5, if the vertex coordinates O of the vertex coordinates (O, A, B) of the grid (triangle) tn are outside the drawing area Ad (the case of condition (5) in FIG. 4), the coordinates O outside the area are replaced with, and corrected to, a closest point O' in the area as indicated by an arrow x, and a corrected grid (triangle O', A, B) tn is displayed.

Besides, the correction method (part 2) of the vertex coordinates (O, A, B) in the grid (triangle) tn shown in parts (B1) to (B3) of FIG. 6 is a correction method in which vertex coordinates existing outside the drawing area Ad are moved to, and replaced with, an intersection between a side of a triangle and a boundary defining the drawing area Ad, the side of the triangle connecting the vertex coordinates outside the area and the vertex coordinates inside the area.

For example, as illustrated in part (B1) of FIG. 6, if the vertex coordinates B of the vertex coordinates (O, A, B) of the grid (triangle) tn are outside the drawing area Ad (the case of condition (2) in FIG. 4), the coordinates B outside the area are replaced with, and corrected to, intersections B1' and B2' between sides BA and BO of a triangle having the vertex coordinates B as an endpoint and a boundary defining the drawing area Ad, as indicated by broken-line arrows y1 and y2, and a corrected grid (quadrangle O, A, B1', B2') tn is displayed.

For example, as illustrated in part (B2) of FIG. 6, if the vertex coordinates A and B of the vertex coordinates (O, A, B) of the grid (triangle) tn are outside the drawing area Ad (the case of condition (4) in FIG. 4), the coordinates A and B existing outside the area are replaced with, and corrected to, intersections A' and B' between sides AO and BO of a triangle having the vertex coordinates A and B as endpoints and a boundary defining the drawing area Ad, as indicated by broken-line arrows ya and yb, and a corrected grid (triangle O, A', B') tn is displayed.

For example, as illustrated in part (B3) of FIG. 6, if the vertex coordinates O of the vertex coordinates (O, A, B) of the grid (triangle) tn are outside the drawing area Ad (the case of condition (5) in FIG. 4), the coordinates O existing outside the area are replaced with, and corrected to, intersections O1' and O2' between sides OA and OB of a triangle having the vertex coordinates O as an endpoint and a boundary defining the drawing area Ad, as indicated by broken-line arrows y1 and y2, and a corrected grid (triangle O, O1', O2') tn is displayed.

In this manner, in the circle drawing process of the present embodiment, in accordance with the display/non-display conditions of each grid (triangle) tn constituting the circle Cr, which are set in the table of FIG. 4, when the vertex coordinates O and A or vertex coordinates O and B of the grid (triangle) tn including the coordinates O that are the center of the circle Cr are outside the drawing area Ad and when all of the vertex coordinates O, A and B of the grid (triangle) tn are outside the drawing area Ad, the grid (triangle) tn is not displayed ((6) to (9) in FIG. 4), or in other words, the grid (triangle) tn is neither generated nor drawn. In addition, when all vertex coordinates O, A and B of the grid (triangle) tn are within the drawing area Ad, the grid (triangle) tn is displayed as such ((1) in FIG. 4). Moreover, when the vertex coordinates A or B of the grid (triangle) tn are outside the drawing area Ad, when both the vertex coordinates A and B are outside the drawing area Ad, and when the vertex coordinates O are outside the drawing area Ad, the grid (triangle/quadrangle) tn in which the vertex coordinates existing outside the area are replaced with coordinates in the drawing area Ad is displayed ((2) to (5) in FIG. 4), and thereby a pseudo-circle Cr is drawn.

Thereby, when the circle Cr protrudes from the drawing area Ad, it is judged whether a predetermined combination of vertices, among a plurality of vertices which specify the shape of the grid (triangle) tn protruding from the drawing area Ad, is included or not. Based on this judgment result, it is judged whether the protruding grid (triangle) tn is to be displayed on the screen of the figure drawing apparatus 10. Of the protruding grids (triangles) tn, the protruding grid (triangle), which was judged not to be displayed, is not displayed on the screen of the figure drawing apparatus 10, and the protruding grid (triangle), which was judged to be displayed, is displayed on the screen of the figure drawing apparatus 10. Accordingly, some grids (triangles) tn of the grids (triangles) tn protruding from the drawing area Ad are not displayed, or in other words, these grids (triangles) tn are neither generated nor drawn. Thus, compared to the case of drawing none of areas of protruding parts and drawing all areas of non-protruding parts, the amount of arithmetic calculations does not increase, or decreases, and by extension a circular cylinder (circle-added figure) having a good appearance can be drawn without using a high-speed, high-performance (expensive) processor (CPU).

Figure 7:
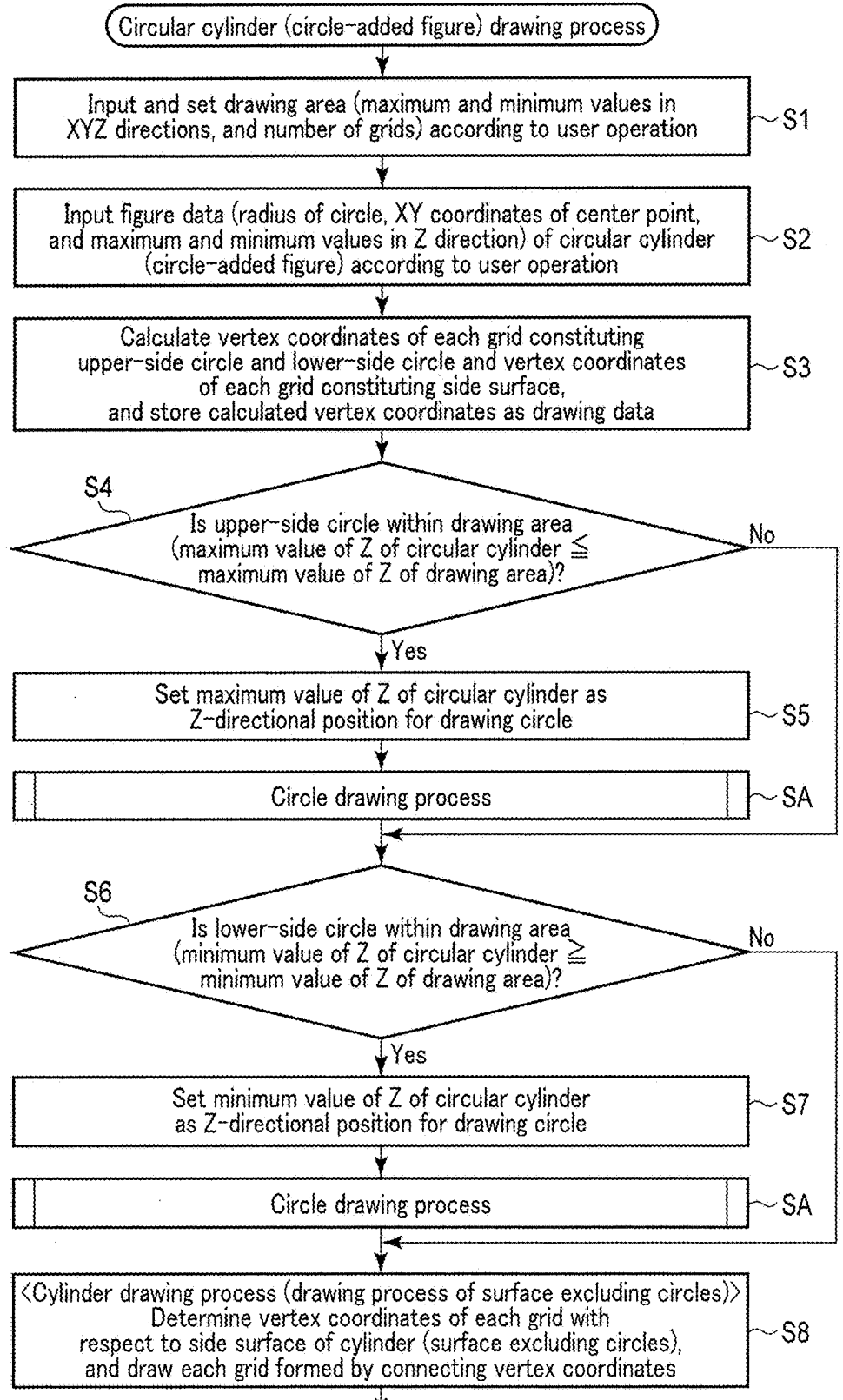
FIG. 7 is a flowchart illustrating the circular cylinder (circle-added figure) drawing process which is executed according to a figure display control program 22a of the figure drawing apparatus 10.

FIG. 7 is a flowchart illustrating the circular cylinder (circle-added figure) drawing process which is executed according to the figure display control program 22a of the figure drawing apparatus 10.

FIG. 8 is a flowchart illustrating the circle drawing process in the circular cylinder (circle-added figure) drawing process of the figure drawing apparatus 10.

Figure 9:
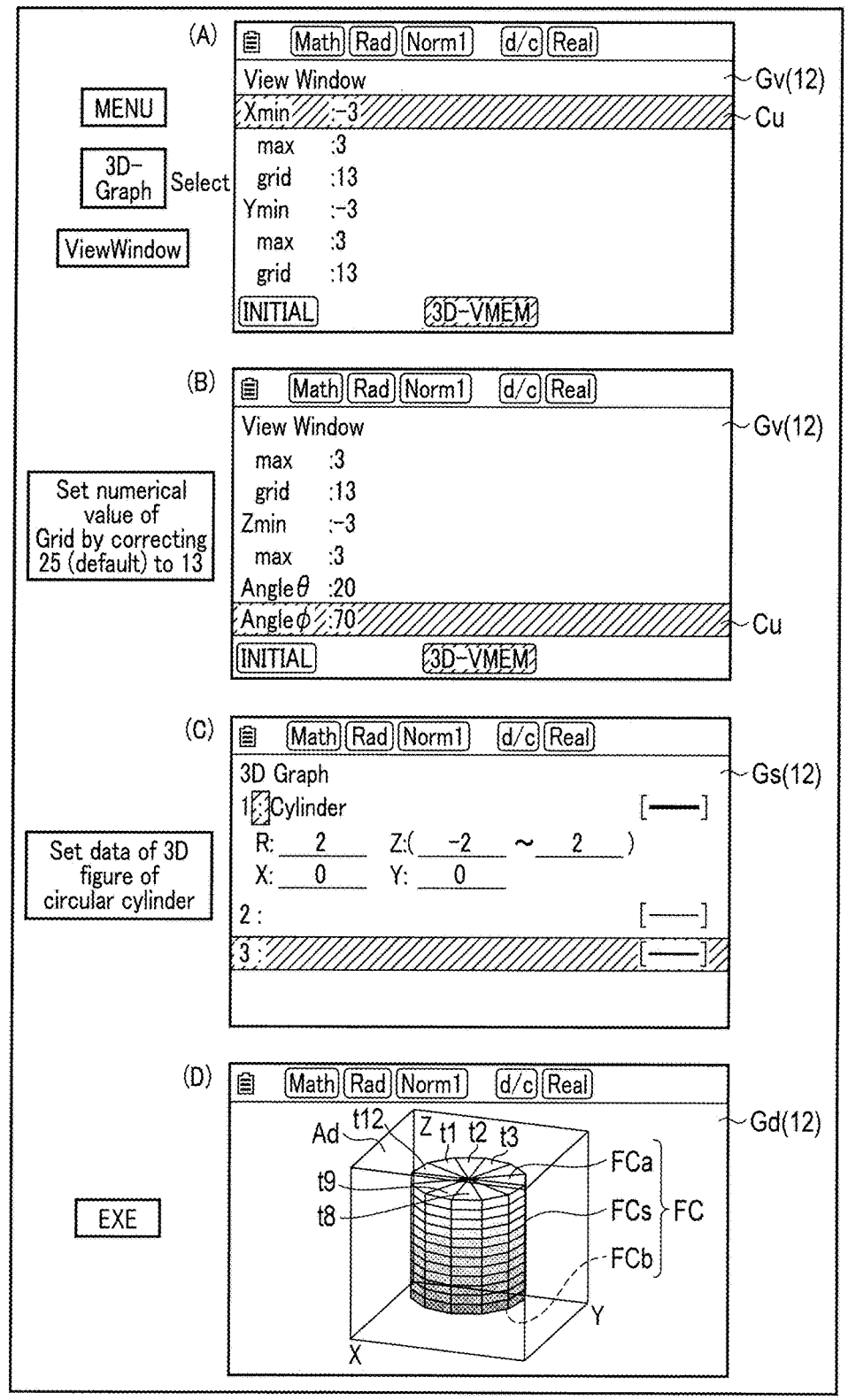
FIG. 9 is a view illustrating a display operation (first embodiment) corresponding to a user operation according to the circular cylinder (circle-added figure) drawing process of the figure drawing apparatus 10.

FIG. 9 is a view illustrating a display operation (first embodiment) corresponding to a user operation according to the circular cylinder (circle-added figure) drawing process of the figure drawing apparatus 10.

(First Embodiment)

(Case in which the Setup of Circle Cr of Circular Cylinder FC does not Protrude from Drawing Area Ad)

As illustrated in part (A) of FIG. 9, an icon [3D-Graph] for drawing a stereoscopic figure is selected from the operation menu (not shown) which is displayed in accordance with the operation of the [MENU] key. If the [V-Window] key is then operated, a drawing area setup screen Gv for stereoscopic figure drawing is displayed on the display output unit 12.

As illustrated in parts (A) and (B) of FIG. 9, in the drawing area setup screen Gv, the data of the drawing area Ad of 3D coordinates for stereoscopic figure drawing is input as Xmin, max=−3, 3, Ymin, max=−3, 3, and Zmin, max=−3, 3, in accordance with the user operation. In addition, the division number (grid) of grids is changed from "25" of the default to "13" and is input. Then, the input data of the drawing area (Xmin, max=−3, 3/Ymin, max=−3, 3/Zmin, max=−3, 3/grid=13) is stored in the V-Window data area 22b (step S1).

Then, as illustrated in part (C) of FIG. 9, a 3D graph setup screen Gs for circular cylinder drawing is displayed on the display output unit 12. In the 3D graph setup screen Gs, if the data of the circular cylinder (circle-added figure) is input as radius R=2, height Z=−2~2, and center coordinates X=0, Y=0, in accordance with the user operation, the input data of the circular cylinder (circle-added figure) (R=2/Z=−2~2/X=0, Y=0) is associated with the mathematical expression for drawing the circular cylinder and is stored in the figure data area 22c (step S2).

Then, as illustrated in part (D) of FIG. 9, if the [EXE] key is operated, the vertex coordinates (O, A, B) of the grids (triangles) t1 to t12, which constitute an upper-side circle (upper cover) FCa and a lower-side circle (lower cover) FCb of a circular cylinder FC, and the vertex coordinates of the grids (quadrangles), which constitute a side surface FCs of the circular cylinder FC, are first calculated according to the circular cylinder (circle-added figure) drawing process which was schematically described above, based on the data of the drawing area (Xmin, max=−3, 3/Ymin, max=−3, 3/Zmin, max=−3, 3/grid=13) stored in the V-Window data area 22b and the data of the circular cylinder (circle-added figure) (R=2/Z=−2~2/X=0, Y=0) stored in the figure data area 22c. Further, drawing data, in which the vertex coordinates of each of the grids of the upper-side circle FCa, lower-side circle FCb and side surface FCs are combined as a set, is stored in the figure drawing data area 22d (step S3).

Then, based on whether the maximum value of height Z (here, Z=2) in the data of the circular cylinder (circle-added figure) is equal to or less than the maximum value (Zmax=3) in the Z direction in the data of the drawing area Ad, it is judged whether the upper-side circle FCa of the circular cylinder FC is within the drawing area Ad or not (step S4).

Here, it is judged that the upper-side circle FCa of the circular cylinder FC is within the drawing area Ad (step S4 (Yes)), and the maximum value (Z=2) of Z of the data of the circular cylinder is set as a Z-directional position for drawing the upper-side circle FCa (step S5).

Then, the process transitions to the circle drawing process illustrated in FIG. 8, and the upper-side circle FCa is drawn (step SA).

In the circle drawing process, the vertex coordinates (O, A, B) of each of the grids (triangles t1 to t12) of the upper-side circle FCa, which are stored in the figure drawing data area 22d, are read out with respect to each grid (triangle) tn (step A1).

It is then judged whether all the read-out vertex coordinates (O, A, B) of the grid (triangle) tn are within the drawing area Ad or not, that is, whether the display condition (1) in FIG. 4 (see (A) in FIG. 5) is satisfied or not (step A2).

Here, based on the data of the circular cylinder (circle-added figure) (R=2/Z=−2~2/X=0, Y=0), it is judged that all the (O, A, B) of each of the grids (triangles) t1 to t12 of the upper-side circle FCa, which are read out from the figure drawing data area 22d, are within the drawing area Ad (Xmin, max=−3, 3/Ymin, max=−3, 3/Zmin, max=−3, 3) (step A2 (Yes)). Thus, a display flag is added to the coordinates (O, A, B) of each of the grids (triangles) t1 to t12 (step A41).

Then, the grids (triangles) t1 to t12, which are constituted by the vertex coordinates (O, A, B) with the display flags added, are successively drawn in the display data area 22e with the areas of these grids (triangles) t1 to t12 being colored (step A5, A6 (Yes)→A1, A2 (Yes)→A41, A5).

If the readout of the vertex coordinates (O, A, B) of the grids (triangles) t1 to t12 of the upper-side circle FCa from the figure drawing data area 22d is finished (step A6 (No)), the process returns to the circular cylinder (circle-added figure) drawing process in FIG. 7.

Thereby, as illustrated in part (D) of FIG. 9, the upper-side circle FCa formed of the triangles t1 to t12, into which the upper-side circle FCa is divided by 12 in the circumferential direction, is displayed on the display output unit 12 in the set-up drawing area Ad (Xmin, max=−3, 3/Ymin, max=−3, 3/Zmin, max=−3, 3).

Besides, if it is judged in step A2 that all the (O, A, B) of the grid (triangle) to of the upper-side circle FCa, which are read out from the figure drawing data area 22d, are not included in the drawing area Ad (step A2 (No)), it is then judged whether (O) of the vertex coordinates (O, A, B) is within the drawing area Ad and either (A) or (B) is outside the drawing area Ad, that is, whether the display condition (2) or (3) in FIG. 4 (see part (A1) of FIG. 5/part (B1) of FIG. 6) is satisfied; or whether (O) is within the drawing area Ad and both (A) and (B) are outside the drawing area Ad, that is, whether the display condition (4) in FIG. 4 (see part (A2) of FIG. 5/part (B2) of FIG. 6) is satisfied; or whether (O) is outside the drawing area Ad and both (A) and (B) are within the drawing area Ad, that is, whether the display condition (5) in FIG. 4 (see part (A3) of FIG. 5/part (B3) of FIG. 6) is satisfied (step A3).

Here, if it is judged that (O) of the vertex coordinates (O, A, B) of the read-out grid (triangle) tn is within the drawing area Ad and either (A) or (B) is outside the drawing area Ad, or that (O) is within the drawing area Ad and both (A) and (B) are outside the drawing area Ad, or that (O) is outside the drawing area Ad and both (A) and (B) are within the drawing area Ad (step A3 (Yes)), the display flag is added to the vertex coordinates (O, A, B) of this grid (triangle) tn (step A42). Then, the vertex coordinates, which were judged to be outside of the drawing area Ad (either (A) or (B); both (A) and (B); or (O)), are replaced with, and corrected to, coordinates within the drawing area Ad according to the above-described correction method (part 1 or part 2) (step A421), and a grid tn constituted by the vertex coordinates (O, A, B) after the correction is drawn (step A5).

Specifically, when the vertex coordinates (O) of the vertex coordinates (O, A, B) of the read-out grid (triangle) tn are within the drawing area Ad and either (A) or (B) is outside the drawing area Ad, the vertex coordinates B (or A) existing outside the area are replaced with, and corrected to, the closest point B' (or A') in the area, for example, as illustrated in part (A1) of FIG. 5, and the grid (triangle O, A, B' (or O, A', B)) tn after the correction is drawn. In addition, when the vertex coordinates (O) are within the drawing area Ad and both (A) and (B) are outside the drawing area Ad, the vertex coordinates A and B existing outside the area are replaced with, and corrected to, the closest point A' and B' in the area, for example, as illustrated in part (A2) of FIG. 5, and the grid (triangle O, A', B') tn after the correction is drawn. Besides, when the vertex coordinates (O) are outside the drawing area Ad and both (A) and (B) are within the drawing area Ad, the vertex coordinates O existing outside the area are replaced with, and corrected to, the closest point O' in the area, for example, as illustrated in part (A3) of FIG. 5, and the grid (triangle O', A, B) tn after the correction is drawn.

On the other hand, when the judgment in step A3 is (No), that is, when the vertex coordinates O and A or vertex coordinates O and B of the read-out vertex coordinates (O, A, B) of the grid (triangle) tn are outside the drawing area Ad (the case of non-display condition (6) or (7) in FIG. 4 (see part (A4) of FIG. 5)), or when all the vertex coordinates (O, A, B) are outside the drawing area Ad (the case of non-display condition (8) in FIG. 4 (see part (A5) of FIG. 5)), the non-display flag is added to the vertex coordinates (O, A, B) of this grid (triangle) tn (step A43), and this grid (triangle) tn is not drawn. If the process returns to the circular cylinder (circle-added figure) drawing process in FIG. 7, the following judgment is executed. Based on whether the minimum value of height Z (here, Z=−2) in the data of the circular cylinder (circle-added figure) is equal to or greater than the minimum value (Zmin=−3) in the Z direction in the data of the drawing area Ad, it is judged whether the lower-side circle FCb of the circular cylinder FC is within the drawing area Ad or not (step S6).

Here, it is judged that the lower-side circle FCb of the circular cylinder FC is within the drawing area Ad (step S6 (Yes)), and the minimum value (Z=−2) of Z of the data of the circular cylinder (circle-added figure) is set as a Z-directional position for drawing the lower-side circle FCb (step S7).

Then, the process transitions to the circle drawing process illustrated in FIG. 8, and the lower-side circle FCb is drawn (step SA).

Specifically, in this circle drawing process, like the process of steps A1, A2, A41, A5 and A6 in the circle drawing process executed for the drawing of the upper-side circle FCa, the lower-side circle FCb formed of the triangles t1 to t12, into which the lower-side circle FCb is divided by 12 in the circumferential direction, is drawn at the Z-directional position (Z=−2) in the set-up drawing area Ad (Xmin, max=−3, 3/Ymin, max=−3, 3/Zmin, max=−3, 3), and the lower-side circle FCb is displayed on the display output unit 12.

Then, the process returns to the circular cylinder (circle-added figure) drawing process in FIG. 7, and the side surface FCs of the circular cylinder (circle-added figure) between the upper-side circle FCa and lower-side circle FCb is drawn. Specifically, the vertex coordinates of grids (quadrangles), which are the drawing data constituting the side surface FCs of the circular cylinder FC stored in the figure drawing data area 22d, are determined as vertex coordinates of grids (quadrangles) which are divided into 12 grids in the vertical and horizontal directions and constitute the side surface FCs. The grids (triangles), which are constituted by connecting the determined vertex coordinates in the vertical and horizontal directions, are drawn in the display data area 22e with the areas of these grids (triangles) being colored (step S8). In the meantime, if any one of the vertex coordinates of the grids (quadrangles), which are the drawing data constituting the side surface FCs of the circular cylinder FC stored in the figure drawing data area 22d, is outside the drawing area Ad, the grid (quadrangle) including the vertex coordinates existing outside the drawing area Ad is not drawn.

Thereby, as illustrated in part (D) of FIG. 9, in the set-up drawing area Ad (Xmin, max=−3, 3, Ymin, max=−3, 3, and Zmin, max=−3, 3), the circular cylinder (circle-added figure) FC (FCa+FCb+FCs) having the center coordinates (X=0, Y=0), radius (R=2) and height (Z=−2~2) is drawn, and is displayed on the display output unit 12 as a stereoscopic figure screen Gd.

Figure 10:
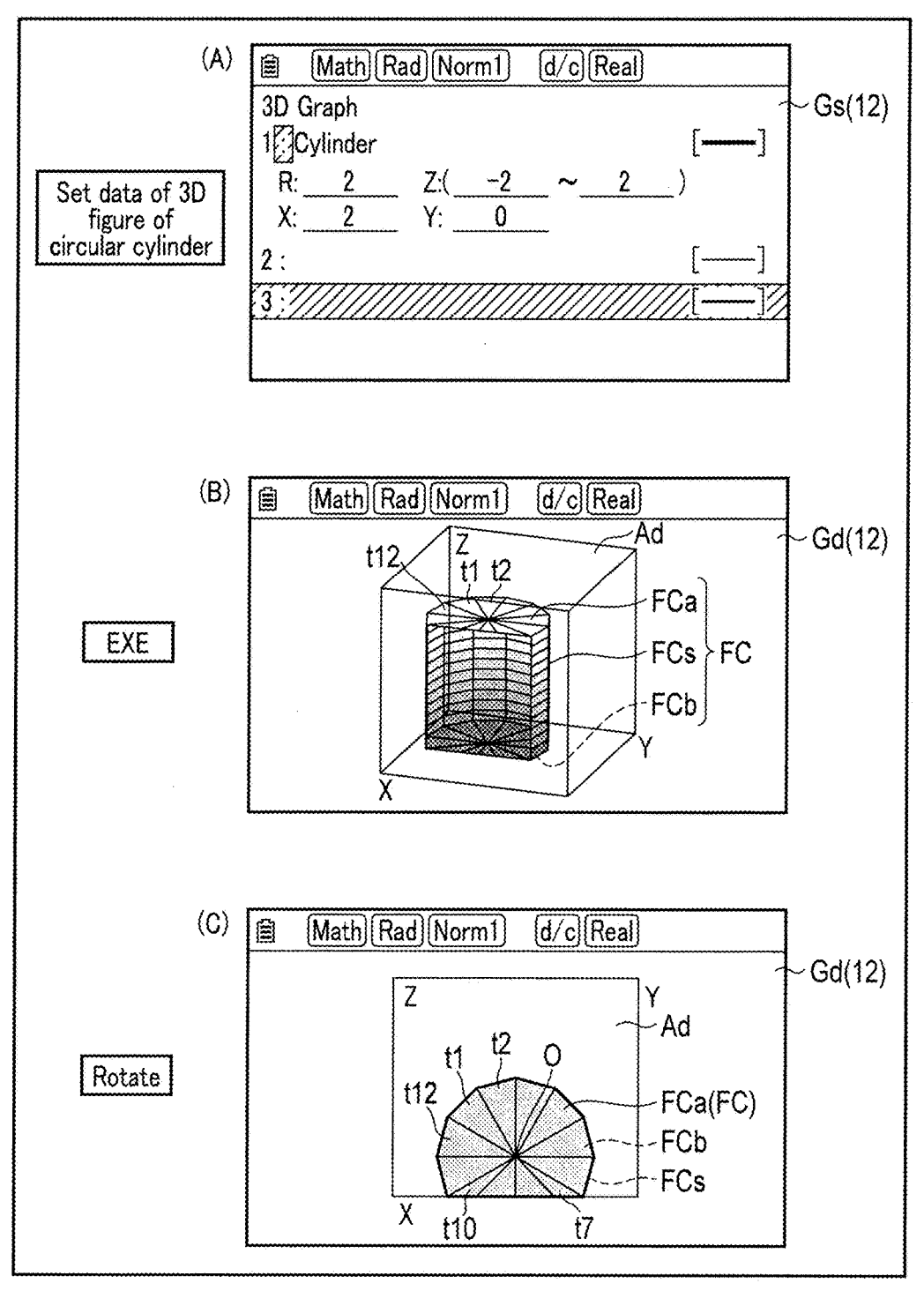
Figure 11:
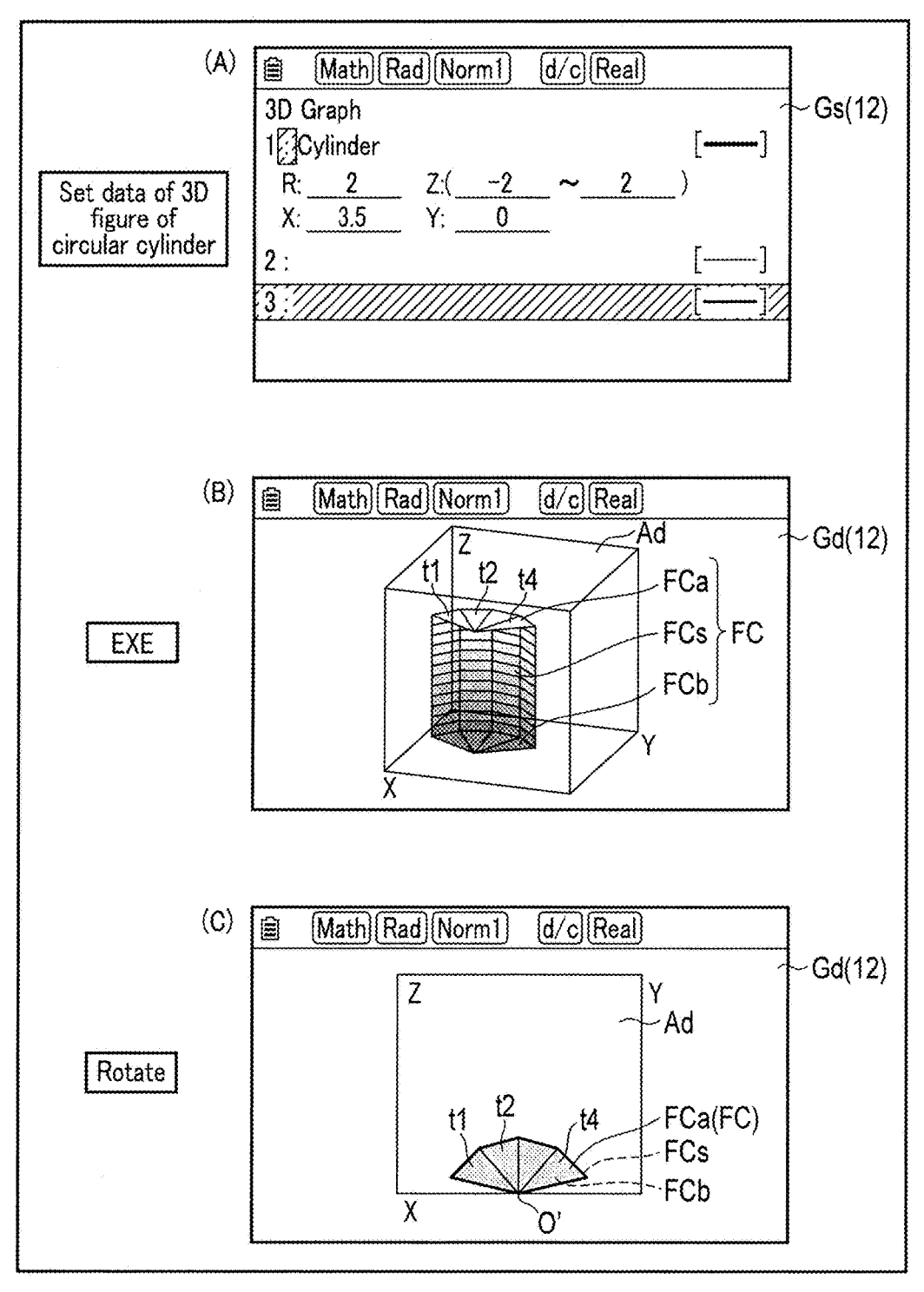

FIG. 10 and FIG. 11 are views illustrating display operations (second and third embodiments) corresponding to user operations according to the circular cylinder (circle-added figure) drawing process of the figure drawing apparatus 10.

Figure 12:
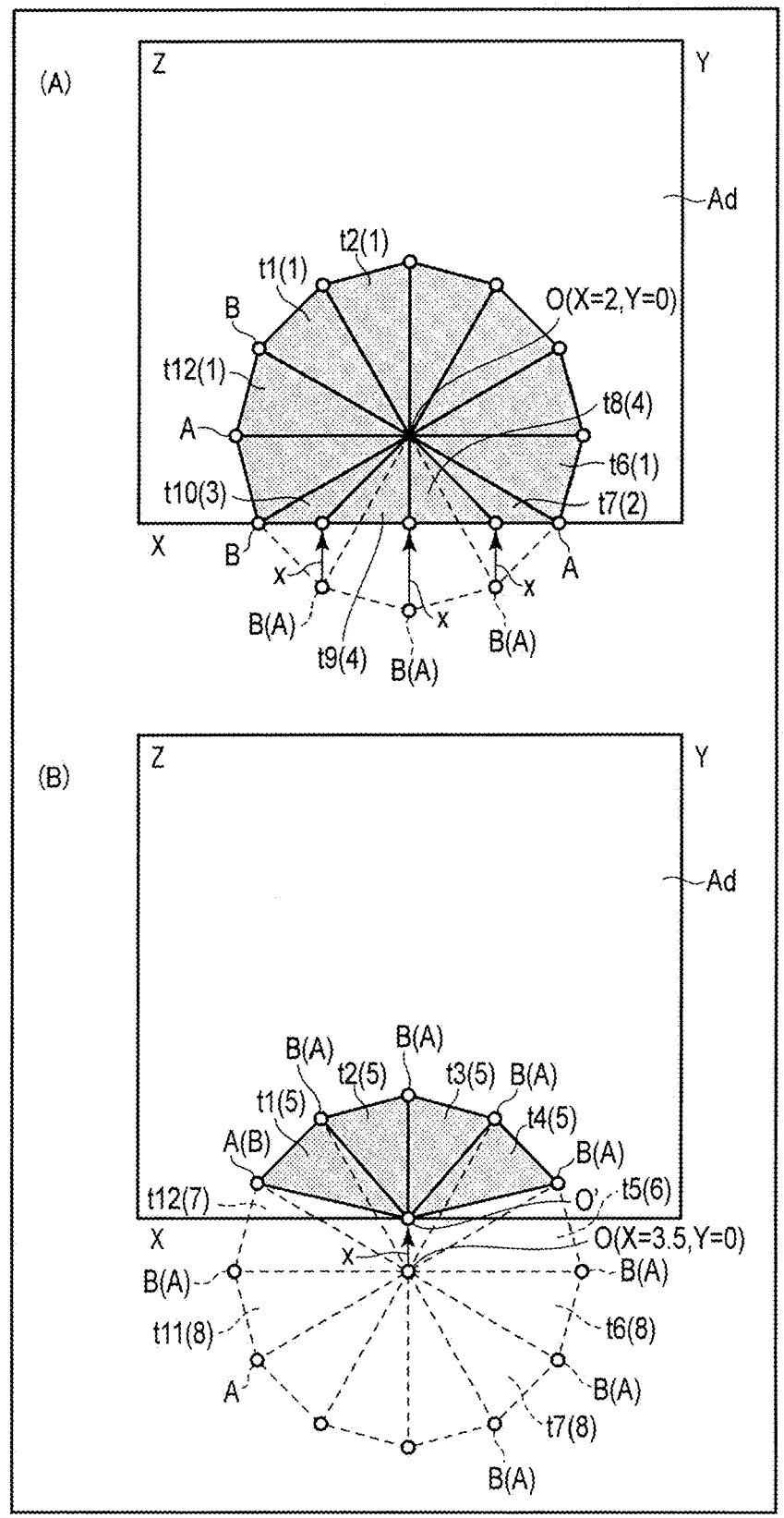
FIG. 12 is a view illustrating concrete examples of correction of the vertex coordinates (O, A, B) of the grids (triangles) according to the circle drawing process in the circular cylinder (circle-added figure) drawing process of the figure drawing apparatus 10, part (A) of FIG. 12 being a view illustrating a concrete example in which a part of a circumference of a circular cylinder FC in FIG. 10 (second embodiment) protruding from the drawing area Ad, and part (B) of FIG. 12 being a view illustrating a concrete example in which the center O of the circle of the circular cylinder FC in FIG. 11 (third embodiment) protruding from the drawing area Ad.

FIG. 12 is a view illustrating concrete examples of correction of the vertex coordinates (O, A, B) of the grids (triangles) according to the circle drawing process in the circular cylinder (circle-added figure) drawing process of the figure drawing apparatus 10, part (A) of FIG. 12 being a view illustrating a concrete example in which a part of a circumference of a circular cylinder FC in FIG. 10 (second embodiment) protruding from the drawing area Ad, and part (B) of FIG. 12 being a view illustrating a concrete example in which the center O of the circle of the circular cylinder FC in FIG. 11 (third embodiment) protruding from the drawing area Ad.

(Second Embodiment)

<Case in which the Setup of Circle Cr of Circular Cylinder FC Horizontally Protrudes from the Drawing Area Ad at part of the circumference of the circle Cr>

In the second embodiment, a case is described in which, as illustrated in part (A) of FIG. 10, in accordance with the 3D graph setup screen Gs, the data of the circular cylinder (circle-added figure) was input as radius R=2, height Z=−2~2 and center coordinates X=2, Y=0, in the same drawing area (Xmin, max=−3, 3/Ymin, max=−3, 3/Zmin, max=−3, 3/grid=13) as set according to the drawing area setup screen Gv illustrated in parts (A) and (B) of FIG. 9.

Specifically, in the circular cylinder (circle-added figure) drawing process of this second embodiment, the center of the circular cylinder (circle-added figure) FC drawn in the first embodiment is displaced by "2" in the X direction. As illustrated in part (A) of FIG. 12, in each of the circle drawing process of the upper-side circle FCa and the circle drawing process of the lower-side circle FCb illustrated in FIG. 8, the process (step A3, A42, A421, A5) in the case in which it is judged that the vertex coordinates (A, or B, or both of A and B) on the circumference of grids t7 to t10 read out from the figure drawing data area 22d are outside the drawing area Ad is different from the process of the first embodiment.

Concretely, when the vertex coordinates (O, A, B) of the grids t7 and t10, which constitute the upper-side circle FCa, are read out, it is judged that the (O) is within the drawing area Ad and one of (A) and (B) is outside the drawing area Ad, and that the display condition (2) or (3) in FIG. 4 is satisfied (step A3 (Yes)).

Then, the display flag is added to the vertex coordinates (O, A, B) of the grid t7 (t10) (step A42). Thereafter, the vertex coordinates B (or A), which were judged to be outside the drawing area Ad, are moved and corrected to closest coordinates B' (A') in the drawing area Ad, as illustrated in part (A) of FIG. 12 (step A421).

Then, a triangle t7 (t10), which is constituted by vertex coordinates O, A and B' (or O, A' and B) that were obtained after the vertex coordinates B (or A) were moved in the drawing area Ad, is drawn with the area of the triangle t7 (t10) being colored (step A5).

Besides, when the vertex coordinates (O, A, B) of the grids t8 and t9, which constitute the upper-side circle FCa, are read out, it is judged that the (O) is within the drawing area Ad and both (A) and (B) are outside the drawing area Ad, and that the display condition (4) in FIG. 4 is satisfied (step A3 (Yes)).

Then, the display flag is added to the vertex coordinates (O, A, B) of the grids t8 and t9 (step A42). Thereafter, the vertex coordinates (A, B), which were judged to be outside the drawing area Ad, are moved and corrected to closest coordinates (A', B') in the drawing area Ad, as illustrated in part (A) of FIG. 12 (step A421).

Then, triangles t8 and t9, which are constituted by vertex coordinates O, A' and B' that were obtained after the vertex coordinates (A, B) were moved into the drawing area Ad, are drawn with the areas of the triangles t8 and t9 being colored (step A5).

As regards the other grids (triangles) t1 to t6, t11, and t12, the vertex coordinates (O, A, B) of which are all within the drawing area Ad, are drawn without correction according to the same process (step A2, A41, A5, A6) as in the first embodiment. As illustrated in part (B) of FIG. 10, an upper-side circle FCa formed of triangles t1 to t12, into which the upper-side circle FCa is divided by 12 in the circumferential direction, is displayed on the display output unit 12.

In the meantime, the circle drawing process of the lower-side circle FCb of the circular cylinder (circle-added figure) FC is the same as the above-described circle drawing process of the upper-side circle FCa, so a description thereof is omitted.

Thereafter, like the circular cylinder (circle-added figure) drawing process of the first embodiment, the side surface FCs of the circular cylinder (circle-added figure) between the upper-side circle FCa and lower-side circle FCb is drawn. In the set-up drawing area Ad (Xmin, max=−3, 3, Ymin, max=−3, 3, and Zmin, max=−3, 3), the circular cylinder (circle-added figure) FC (FCa+FCb+FCs) having the center coordinates (X=2, Y=0), radius (R=2) and height (Z=−2~2) is drawn, and is displayed on the display output unit 12 (step S8).

In this case, as regards the grids (quadrangles) which constitute the side surface FCs of the circular cylinder FC, at least any one of the vertex coordinates of those grids (quadrangles) of the side surface FCs, which correspond to the grids t7 to t10 constituting the circles FCa and FCb that are the targets of correction of vertex coordinates, are outside the drawing area Ad. Thus, the grids (quadrangles) including the vertex coordinates outside the drawing area Ad are not drawn.

Thereby, even when a part of the circumference of the circle FCa, FCb is so set as to protrude from the drawing area Ad, it is judged whether a predetermined combination of vertices, among a plurality of vertices which specify the shape of the grid (triangle) tn protruding from the drawing area Ad, is included in the drawing area Ad. Based on this judgment result, it is judged whether the protruding grid (triangle) tn is to be displayed on the screen of the figure drawing apparatus 10. Of the protruding grids (triangles) tn, the protruding grid (triangle), which was judged not to be displayed, is not displayed on the screen of the figure drawing apparatus 10, and the protruding grid (triangle), which was judged to be displayed, is displayed on the screen of the figure drawing apparatus 10. Accordingly, some grids (triangles) tn of the grids (triangles) tn protruding from the drawing area Ad are not displayed, or in other words, these grids (triangles) tn are neither generated nor drawn. Thus, compared to the case of drawing none of areas of protruding parts and drawing all areas of non-protruding parts, the amount of arithmetic calculations does not increase, or decreases, and by extension a circular cylinder (circle-added figure) having a good appearance can be drawn without using a high-speed, high-performance (expensive) processor (CPU).

Part (C) of FIG. 10 illustrates a display state in the case in which the circular cylinder (circle-added figure) FC drawn in part (B) of FIG. 10 was subjected to a rotation process toward a plan-view direction.

(Third Embodiment)
<Case in which the Center O of Circle Cr of Circular Cylinder FC Horizontally Protrudes from the Drawing Area Ad>

In the third embodiment, a case is described in which, as illustrated in part (A) of FIG. 11, in accordance with the 3D graph setup screen Gs, the data of the circular cylinder (circle-added figure) was input as radius R=2, height Z=−2~2 and center coordinates X=3.5, Y=0, in the same drawing area (Xmin, max=−3, 3/Ymin, max=−3, 3/Zmin, max=−3, 3/grid=13) as set according to the drawing area setup screen Gv illustrated in parts (A) and (B) of FIG. 9.

Specifically, in the circular cylinder (circle-added figure) drawing process of this third embodiment, the center of the circular cylinder (circle-added figure) FC drawn in the first embodiment is displaced by "3.5" in the X direction. As illustrated in part (B) of FIG. 12, in each of the circle drawing process of the upper-side circle FCa and the circle drawing process of the lower-side circle FCb illustrated in FIG. 8, the process (step A3, A42, A421, A5) in the case in which it is judged that the vertex coordinates (O) of the grids t1 to t4, which correspond to the center of the circle Cr and are read out from the figure drawing data area 22d, are outside the drawing area Ad, and the process (step A3 (No), A43, A5) in the case in which it is judged that the vertex coordinates O, B (O, A) of each grid t5 (t12) and all vertex coordinates (O, A, B) of the grids t6 to t11 are outside the drawing area Ad, are different from the processes of the first embodiment.

Concretely, when the vertex coordinates (O, A, B) of the grids t1 to t4, which constitute the upper-side circle FCa, are read out, it is judged that the (O) is outside the drawing area Ad and both the (A) and (B) are inside the drawing area Ad, and that the display condition (4) in FIG. 4 is satisfied (step A3 (Yes)).

Then, the display flag is added to the vertex coordinates (O, A, B) of the grids t1 to t4 (step A42). Thereafter, the vertex coordinates O, which were judged to be outside the drawing area Ad, are moved and corrected to closest coordinates O' in the drawing area Ad, as illustrated in part (B) of FIG. 12 (step A421).

Then, triangles t1 to t4, which were constituted by vertex coordinates O', A and B that were obtained after the vertex coordinates O were moved into the drawing area Ad, are drawn with the areas of the triangles t1 to t4 being colored (step A5).

On the other hand, when the vertex coordinates (O, A, B) of the grids t5 to t12, which constitute the upper-side circle FCa, are read out, it is judged that the (O, B) or (O, A), or all vertex coordinates (O, A, B) are outside the drawing area Ad, and that the display conditions (6), (7) or (8) in FIG. 4 is satisfied (step A3 (No)).

Then, the non-display flag is added to the vertex coordinates (O, A, B) of the grids t5 to t12 (step A43), and these grids (triangles) t5 to t12 are not drawn.

In the meantime, the circle drawing process of the lower-side circle FCb of the circular cylinder (circle-added figure) FC is the same as the above-described circle drawing process of the upper-side circle FCa, so a description thereof is omitted.

Thereafter, like the circular cylinder (circle-added figure) drawing process of each of the first and second embodiments, the side surface FCs of the circular cylinder (circle-added figure) between the upper-side circle FCa and lower-side circle FCb is drawn. In the set-up drawing area Ad (Xmin, max=−3, 3, Ymin, max=−3, 3, and Zmin, max=−3, 3), the circular cylinder (circle-added figure) FC (FCa+FCb+FCs) having the center coordinates (X=3.5, Y=0), radius (R=2) and height (Z=−2~2) is drawn, and is displayed on the display output unit 12 (step S8).

In this case, as regards the grids (quadrangles) which constitute the side surface FCs of the circular cylinder FC, at least any one of the vertex coordinates of those grids (quadrangles) of the side surface FCs, which correspond to the grids t5 to t12 that constitute the circles FCa and FCb and are not displayed, are outside the drawing area Ad. Thus, the grids (quadrangles) including the vertex coordinates outside the drawing area Ad are not drawn.

Thereby, like the second embodiment, even when the center O of the circle FCa, FCb is so set as to protrude from the drawing area Ad, it is judged whether a predetermined combination of vertices, among a plurality of vertices which specify the shape of the grid (triangle) tn protruding from the drawing area Ad, is included in the drawing area Ad. Based on this judgment result, it is judged whether the protruding grid (triangle) tn is to be displayed on the screen of the figure drawing apparatus 10. Of the protruding grids (triangles) tn, the protruding grid (triangle), which was judged not to be displayed, is not displayed on the screen of the figure drawing apparatus 10, and the protruding grid (triangle), which was judged to be displayed, is displayed on the screen of the figure drawing apparatus 10. Accordingly, some grids (triangles) tn of the grids (triangles) tn protruding from the drawing area Ad are not displayed, or in other words, these grids (triangles) tn are neither generated nor drawn. Thus, compared to the case of drawing none of areas of protruding parts and drawing all areas of non-protruding parts, the amount of arithmetic calculations does not increase, or decreases, and by extension a circular cylinder (circle-added figure) having a good appearance can be drawn without using a high-speed, high-performance (expensive) processor (CPU).

Part (C) of FIG. 11 illustrates a display state in the case in which the circular cylinder (circle-added figure) FC drawn in part (B) of FIG. 11 was subjected to a rotation process toward a plan-view direction.

(Fourth Embodiment)

<Case in which the Setup of Circle Cr of Circular Cylinder FC Horizontally Protrudes from Drawing Area Ad and the Height Z of Circular Cylinder FC Exceeds Z-directional Minimum Value (Maximum Value) in Drawing Area Ad>

FIG. 13 is a view illustrating a display operation (fourth embodiment) corresponding to a user operation according to the circular cylinder (circle-added figure) drawing process of the figure drawing apparatus 10.

In the fourth embodiment (part 1: see part (A) of FIG. 13), a case is described in which, in accordance with the 3D graph setup screen Gs illustrated in part (A) of FIG. 10, the data of the circular cylinder (circle-added figure) was input as radius R=2, height Z=−4~2 and center coordinates X=2, Y=0, in the same drawing area Ad (Xmin, max=−3, 3/Ymin, max=−3, 3/Zmin, max=−3, 3/grid=13) as set according to the drawing area setup screen Gv illustrated in parts (A) and (B) of FIG. 9.

Specifically, in the circular cylinder (circle-added figure) drawing process of the fourth embodiment (part 1), the height of the circular cylinder (circle-added figure) drawn in the second embodiment is set as Z=−4~2 and the circular cylinder (circle-added figure) is extended by "−2" in the Z direction. In the circle drawing process (step SA) of the upper-side circle FCa in the circular cylinder (circle-added figure) drawing process illustrated in FIG. 7, like the second embodiment (see part (A) of FIG. 12), the grids (triangles) t1 to t6, t11, and t12, the vertex coordinates (O, A, B) of which are all within the drawing area Ad (the case of display condition (1) in FIG. 4), are drawn without correction (step A1, A2, A41, A5, A6).

In addition, as regards the grids (triangles) t7 to t10 having either the vertex coordinates (A) or (B) or both (A) and (B) outside the drawing area Ad (the case of display condition (2), (3) or (4) in FIG. 4), the vertex coordinates (A) or (B) or both (A) and (B) existing outside the drawing area Ad are corrected to closest coordinates (A', B') in the drawing area Ad, and the grids (triangles) t7 to t10 are drawn (step A1, A3 (Yes), A42, A421, A5, A6).

Thereby, as illustrated in part (A) of FIG. 13, the upper-side circle FCa formed of the triangles t1 to t12, into which the upper-side circle FCa is divided by 12 in the circumferential direction, is displayed on the display output unit 12.

Thereafter, in the circular cylinder (circle-added figure) drawing process illustrated in FIG. 7, in accordance with the height Z=−4~2 of the circular cylinder (circle-added figure) FC, it is judged that the lower-side circle FCb is outside the drawing area Ad (step S6 (No)).

Thereby, as illustrated in part (A) of FIG. 13, the circle drawing process (step S7, SA) of the lower-side circle FCb is not executed.

Subsequently, like the circular cylinder (circle-added figure) drawing process of each of the above embodiments, the side surface FCs of the circular cylinder (circle-added figure) is drawn. In the set-up drawing area Ad (Xmin, max=−3, 3, Ymin, max=−3, 3, and Zmin, max=−3, 3), the circular cylinder (circle-added figure) FC (FCa+FCs) having the center coordinates (X=2, Y=0), radius (R=2) and height (Z=−4~2) and having no lower-side circle FCb is drawn, and is displayed on the display output unit 12 (step S8).

Next, in the fourth embodiment (part 2: see part (B) of FIG. 13), a case is described in which, in accordance with the 3D graph setup screen Gs illustrated in part (A) of FIG. 10, the data of the circular cylinder (circle-added figure) was input as radius R=2, height Z=−2~4 and center coordinates X=2, Y=0, in the same drawing area Ad (Xmin, max=−3, 3/Ymin, max=−3, 3/Zmin, max=−3, 3/grid=13) as set according to the drawing area setup screen Gv illustrated in parts (A) and (B) of FIG. 9.

Specifically, in the circular cylinder (circle-added figure) drawing process of the fourth embodiment (part 2), the height of the circular cylinder (circle-added figure) drawn in the second embodiment is set as Z=−2~4 and the circular cylinder (circle-added figure) is extended by "+2" in the Z direction, and it is judged that the upper-side circle FCa is outside the drawing area Ad (step S4 (No)).

Thereby, as illustrated in part (B) of FIG. 13, the circle drawing process (step S5, SA) of the upper-side circle FCa is not executed.

Then, in the circle drawing process (step SA) of the lower-side circle FCb in the circular cylinder (circle-added figure) drawing process illustrated in FIG. 7, like the second embodiment (see part (A) of FIG. 12), the grids (triangles) t1 to t6, t11, and t12, the vertex coordinates (O, A, B) of which are all within the drawing area Ad (the case of display condition (1) in FIG. 4), are drawn without correction (step A1, A2, A41, A5, A6).

In addition, as regards the grids (triangles) t7 to t10 having either the vertex coordinates (A) or (B) or both (A) and (B) outside the drawing area Ad (the case of display condition (2), (3) or (4) in FIG. 4), the vertex coordinates (A or B, or both A and B) existing outside the drawing area Ad are corrected to closest coordinates (A', B') in the drawing area Ad, and the grids (triangles) t7 to t10 are drawn (step A1, A3 (Yes), A42, A421, A5, A6).

Then, like the circular cylinder (circle-added figure) drawing process of each of the above embodiments, the side surface FCs of the circular cylinder (circle-added figure) is drawn. In the set-up drawing area Ad (Xmin, max=−3, 3, Ymin, max=−3, 3, and Zmin, max=−3, 3), the circular cylinder (circle-added figure) FC (FCb+FCs) having the center coordinates (X=2, Y=0), radius (R=2) and height (Z=−2~4) and having no upper-side circle FCa is drawn, and is displayed on the display output unit 12 (step S8).

Thereby, like the second embodiment, even when the circle FCa, FCb is so set as to protrude from the drawing area Ad, some grids (triangles) tn of the grids (triangles) tn protruding from the drawing area Ad are not displayed, or in other words, these grids (triangles) tn are neither generated nor drawn. Thus, compared to the case of drawing none of areas of protruding parts and drawing all areas of non-protruding parts, the amount of arithmetic calculations does not increase, or decreases, and by extension a circular cylinder (circle-added figure) FC having a good appearance can be drawn without using a high-speed, high-performance (expensive) processor (CPU).

Besides, in the correction process (step A421) of the vertex coordinates of the grid (triangle) to in each circle drawing process (step SA) described in the first to fourth embodiments, use was made of the correction method (part 1) in which the vertex coordinates existing outside the drawing area Ad are moved to, and replaced with, the closest point in the drawing area Ad, as described with reference to parts (A1) to (A3) of FIG. 5. Alternatively, as described with reference to parts (B1) to (B3) of FIG. 6, use may be made of the correction method (part 2) in which the vertex coordinates existing outside the drawing area Ad are moved to, and replaced with, an intersection between a side of a triangle and a boundary defining the drawing area Ad, the side of the triangle connecting the vertex coordinates outside the area and the vertex coordinates inside the area.

Thus, according to the figure drawing apparatus 10 with the above-described configuration, the data (Xmin~max/Ymin~max/Zmin~max) of the drawing area Ad of the stereoscopic figure drawing is set in accordance with the drawing area setup screen Gv, and the drawing data (the mathematical expression corresponding to the circular cylinder and the parameters thereof, i.e. the radius R/height Z/center coordinates X, Y) of the circular cylinder (circle-added figure) FC is input in accordance with the 3D graph setup screen Gs. Then, based on the data of the drawing area Ad and the drawing data of the circular cylinder (circle-added figure) FC, each of the circles FCa and FCb at both ends of the circular cylinder (circle-added figure) FC is drawn by the set of plural triangles (grid areas) tn which are formed to have, as vertex coordinates (O, A, B), the center coordinates O of the circle and the coordinates A and B that are neighboring division points on the circumference of the circle at a time when the circumference of the circle is divided into plural portions. In addition, the side surface FCs of the circular cylinder (circle-added figure) FC is drawn by the set of plural quadrangles (grid areas) which are formed by connection lines and a plurality of division lines parallel to the circles FCa and FCb. The connection lines connect the vertex coordinates (A, B) on the circumference of the plural triangles tn corresponding to one circle FCa of the circular cylinder (circle-added figure) FC, and the vertex coordinates (A, B) on the circumference of the plural triangles tn corresponding to the other circle FCb.

In addition, when the circle FCa, FCb is drawn as the set of the plural triangles (grid areas) tn, if (O) and (A), or (O) and (B), of the vertex coordinates (O, A, B) of each triangle tn are outside the setup drawing area Ad, or if all of the vertex coordinates (O, A, B) are outside the setup drawing area Ad, this triangle tn is not drawn. If one of (A) and (B), or both (A) and (B), are outside the drawing area Ad, or if only (O) is outside the drawing area Ad, the vertex coordinates (A) or (B), or (A, B) or (O) existing outside the drawing area Ad are replaced with coordinates on the boundary defining the drawing area Ad, and the triangle tn including the vertex coordinates after the replacement is drawn.

Besides, according to the figure drawing apparatus 10 with the above-described configuration, when the side surface FCs of the circular cylinder (circle-added figure) FC is drawn as the set of plural quadrangles (grid areas), if any one of the vertex coordinates of each quadrangle is outside the drawing area Ad, this quadrangle is not drawn. If all the vertex coordinates of each quadrangle are within the drawing area Ad, this quadrangle is drawn.

Thereby, like the second embodiment, even when the circle FCa, FCb of the circular cylinder (circle-added cylinder) is set in the drawing data of the circular cylinder (circle-added cylinder) so as to protrude from the drawing area Ad, some grids (triangles) tn of the grids (triangles) tn protruding from the drawing area Ad are not displayed, or in other words, these grids (triangles) tn are neither generated nor drawn. Thus, compared to the case of drawing none of areas of protruding parts and drawing all areas of non-protruding parts, the amount of arithmetic calculations does not increase, or decreases, and by extension a circular cylinder (circle-added figure) FC having a good appearance can be drawn without using a high-speed, high-performance (expensive) processor (CPU).

In each of the above embodiments, the case was described in which the stereoscopic figure of the circular cylinder is drawn as the circle-added figure. However, the circle-added figure includes an elliptic cylinder whose circles at both ends are elliptic, a circular cone, an elliptical cone, etc.

Besides, the upper surface or lower surface of the circle-added figure may not be circular, but may be polygonal. In this case, by replacing the circle with a polygonal surface, and by replacing the center point of the circle with the point of the center of gravity of the polygon, the present technique can be utilized.

In the meantime, the methods of the respective processes by the figure drawing apparatus 10, which has been described in each of the above embodiments, that is, the methods of the circular cylinder (circle-added figure) drawing process illustrated in the flowchart of FIG. 7 and the circle drawing process in the circular cylinder (circle-added figure) drawing process illustrated in the flowchart of FIG. 8 can be stored as computer-executable programs in a medium of an external storage device, such as a memory card (ROM card, RAM card, etc.), a magnetic disk (floppy (trademark) disk, hard disk, etc.), an optical disc (CD-ROM, DVD, etc.), or a semiconductor memory, and can be distributed. In addition, the computer (CPU) of the electronic device including the display function reads the program, which is stored in the medium of the external storage device, into the storage device, and the operation is controlled by this read-in program. Thereby, it is possible to realize the drawing function of the circle-added figure described in each of the embodiments, and to execute the same processes as by the above-described methods.

In addition, the data of the program for realizing each of the above-described methods can be transmitted on a communication network (N) in the form of a program code, and the data of the program can be taken in the electronic device including the display function from a computer apparatus (program server) connected to this communication network (N), and stored in the storage device, thereby realizing the above-described drawing function of the circle-added figure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control method of a figure drawing apparatus comprising a processor, the control method performed by the processor comprising:
   a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device;
   a process in which one or more triangles are specified as the one or more arbitrary shapes, vertices of each of the one or more triangles being a center point of a circle or an ellipse as the plane to be drawn and two neighboring different points on an arc of the circle or the ellipse; and
   a process in which, when the center point among three vertices of one triangle among the one or more triangles is located outside the drawing area and the two points on the arc is located within the drawing area, the one triangle is displayed within the drawing area of the display screen.

2. The control method of claim 1, wherein the control method further comprises:
   a process in which, when the plane is drawn within the drawing area of the display screen of the display device, if a predetermined second combination of two or more points of the plurality of points of one arbitrary shape among the one or more arbitrary shapes is not located within the drawing area, at least one point of the plurality of points, which is located outside the drawing area, is moved to a point within the drawing area, and a different shape from the one arbitrary shape is drawn within the drawing area of the display screen, the different shape being formed by connecting the at least one point which is moved among the plurality of points of the one arbitrary shape and at least one point which is not moved among the plurality of points of the one arbitrary shape.

3. The control method of claim 2, wherein the control method further comprises:
   a process in which, when the at least one point of the plurality of points is moved, the at least one point is moved to a point on a boundary defining the drawing area, the point on the boundary being closest to the at least one point.

4. The control method of claim 1, wherein the control method further comprises:
   a process in which, when the plane is drawn within the drawing area of the display screen, one polygon is displayed as the one or more arbitrary shape within the drawing area of the display screen of the display device, the one polygon having as vertices (i) at least one point, located within the drawing area, among the center point and the two neighboring different points on the arc and (ii) at least one intersection between at least one side of the one triangle and a boundary defining the drawing area.

5. The control method of claim 1, wherein the control method further comprises:
   a process in which an input of at least one mathematical expression which specifies a circular cylinder is accepted; and a process in which a circle or an ellipse which forms a bottom surface of the circular cylinder is displayed within the drawing area of the display screen as the plane to be drawn.

6. The control method of claim 5, wherein the control method further comprises:
a process in which a side surface of the circular cylinder is segmented into a plurality of polygons which are arranged in a grid pattern; and
a process in which, when the plane is drawn within the drawing area of the display screen, for each of the plurality of polygons, if any one of the plurality of vertices specifying a shape of the polygon is located outside the drawing area, the polygon is not displayed within the drawing area of the display screen, and if all of the plurality of vertices specifying a shape of the polygon are located within the drawing area, the polygon is displayed in the drawing area of the display screen.

7. A control method of a figure drawing apparatus comprising a processor, the control method performed by the processor comprising:
a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device;
a process in which one or more triangles are specified as the one or more arbitrary shapes, vertices of each of the one or more triangles being a center point of a circle or an ellipse as the plane to be drawn and two neighboring different points on an arc of the circle or the ellipse; and
a process in which, when the center point among three vertices of one triangle among the one or more triangles is located outside the drawing area and at least one of the two points on the arc is located outside the drawing area, the one triangle is not displayed within the drawing area of the display screen.

8. A figure drawing apparatus comprising a processor, the processor executing, in accordance with an instruction stored in a storage unit:
a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device;
a process in which one or more triangles are specified as the one or more arbitrary shapes, vertices of each of the one or more triangles being a center point of a circle or an ellipse as the plane to be drawn and two neighboring different points on an arc of the circle or the ellipse; and
a process in which, when the center point among three vertices of one triangle among the one or more triangles is located outside the drawing area and the two points on the arc is located within the drawing area, the one triangle is displayed within the drawing area of the display screen.

9. The figure drawing apparatus according to claim 8, wherein the processor executes, in accordance with the instruction stored in the storage unit:
a process in which, when the plane is drawn within the drawing area of the display screen of the display device, if a predetermined second combination of two or more points of the plurality of points of one arbitrary shape among the one or more arbitrary shapes is not located within the drawing area, at least one point of the plurality of points, which is located outside the drawing area, is moved to a point within the drawing area, and a different shape from the one arbitrary shape is drawn within the drawing area of the display screen, the different shape being formed by connecting the at least one point which is moved among the plurality of points of the one arbitrary shape and at least one point which is not moved among the plurality of points of the one arbitrary shape.

10. The figure drawing apparatus according to claim 9, wherein the processor executes:
a process in which, when the at least one point of the plurality of points is moved, the at least one point is moved to a point on a boundary defining the drawing area, the point on the boundary being closest to the at least one point.

11. A non-transitory recording medium having a program recorded thereon that is executable to control a computer to execute:
a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device;
a process in which one or more triangles are specified as the one or more arbitrary shapes, vertices of each of the one or more triangles being a center point of a circle or an ellipse as the plane to be drawn and two neighboring different points on an arc of the circle or the ellipse; and
a process in which, when the center point among three vertices of one triangle among the one or more triangles is located outside the drawing area and the two points on the arc is located within the drawing area, the one triangle is displayed within the drawing area of the display screen.

12. The non-transitory recording medium according to claim 11, wherein the program is executable to control the computer to execute:
a process in which, when the plane is drawn within the drawing area of the display screen of the display device, if a predetermined second combination of two or more points of the plurality of points of one arbitrary shape among the one or more arbitrary shapes is not located within the drawing area, at least one point of the plurality of points, which is located outside the drawing area, is moved to a point within the drawing area, and a different shape from the one arbitrary shape is drawn within the drawing area of the display screen, the different shape being formed by connecting the at least one point which is moved among the plurality of points of the one arbitrary shape and at least one point which is not moved among the plurality of points of the one arbitrary shape.

13. The non-transitory recording medium according to claim 12, wherein the program is executable to control the computer to execute:

a process in which, when the at least one point of the plurality of points is moved, the at least one point is moved to a point on a boundary defining the drawing area, the point on the boundary being closest to the at least one point.

14. A figure drawing apparatus comprising a processor, the processor executing, in accordance with an instruction stored in a storage unit:

a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device;

a process in which one or more triangles are specified as the one or more arbitrary shapes, vertices of each of the one or more triangles being a center point of a circle or an ellipse as the plane to be drawn and two neighboring different points on an arc of the circle or the ellipse; and a process in which, when the center point among three vertices of one triangle among the one or more triangles is located outside the drawing area and at least one of the two points on the arc is located outside the drawing area, the one triangle is not displayed within the drawing area of the display screen.

15. The figure drawing apparatus according to claim 14, wherein the processor executes:

a process in which, when the plane is drawn within the drawing area of the display screen of the display device, if a predetermined second combination of two or more points of the plurality of points of one arbitrary shape among the one or more arbitrary shapes is not located within the drawing area, at least one point of the plurality of points, which is located outside the drawing area, is moved to a point within the drawing area, and a different shape from the one arbitrary shape is drawn within the drawing area of the display screen, the different shape being formed by connecting the at least one point which is moved among the plurality of points of the one arbitrary shape and at least one point which is not moved among the plurality of points of the one arbitrary shape.

16. The figure drawing apparatus according to claim 15, wherein processor executes:

a process in which, when the at least one point of the plurality of points is moved, the at least one point is moved to a point on a boundary defining the drawing area, the point on the boundary being closest to the at least one point.

17. A non-transitory recording medium having a program recorded thereon that is executable to control a computer to execute:

a process in which, when drawing one or more arbitrary shapes formed by connecting a plurality of points included in a plane to be drawn and thereby drawing the plane to be drawn within a drawing area of a display screen of a display device, if a predetermined first combination of two or more points of the plurality of points of one arbitrary shape among the one or more arbitrary shapes is not located within the drawing area, the one arbitrary shape is not drawn within the drawing area of the display screen by the display device;

a process in which one or more triangles are specified as the one or more arbitrary shapes, vertices of each of the one or more triangles being a center point of a circle or an ellipse as the plane to be drawn and two neighboring different points on an arc of the circle or the ellipse; and a process in which, when the center point among three vertices of one triangle among the one or more triangles is located outside the drawing area and at least one of the two points on the arc is located outside the drawing area, the one triangle is not displayed within the drawing area of the display screen.

18. The non-transitory recording medium according to claim 17, wherein the program is executable to control the computer to execute:

a process in which, when the plane is drawn within the drawing area of the display screen of the display device, if a predetermined second combination of two or more points of the plurality of points of one arbitrary shape among the one or more arbitrary shapes is not located within the drawing area, at least one point of the plurality of points, which is located outside the drawing area, is moved to a point within the drawing area, and a different shape from the one arbitrary shape is drawn within the drawing area of the display screen, the different shape being formed by connecting the at least one point which is moved among the plurality of points of the one arbitrary shape and at least one point which is not moved among the plurality of points of the one arbitrary shape.

19. The non-transitory recording medium according to claim 18, wherein the program is executable to control the computer to execute:

a process in which, when the at least one point of the plurality of points is moved, the at least one point is moved to a point on a boundary defining the drawing area, the point on the boundary being closest to the at least one point.

* * * * *